US010089144B1

(12) United States Patent
Nagpal et al.

(10) Patent No.: US 10,089,144 B1
(45) Date of Patent: *Oct. 2, 2018

(54) SCHEDULING COMPUTING JOBS OVER FORECASTED DEMANDS FOR COMPUTING RESOURCES

(71) Applicant: Nutanix, Inc., San Jose, CA (US)

(72) Inventors: Abhinay Nagpal, San Jose, CA (US); Bharat Kumar Beedu, Santa Clara, CA (US); Himanshu Shukla, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/186,235

(22) Filed: Jun. 17, 2016

(51) Int. Cl.
*G06F 9/48* (2006.01)
*G06F 9/50* (2006.01)
*G06F 17/30* (2006.01)
*G06N 5/02* (2006.01)
*G06F 11/14* (2006.01)

(52) U.S. Cl.
CPC .......... *G06F 9/4881* (2013.01); *G06F 9/5027* (2013.01); *G06F 9/5038* (2013.01); *G06F 11/1461* (2013.01); *G06F 17/30424* (2013.01); *G06N 5/02* (2013.01)

(58) Field of Classification Search
CPC .... G06F 9/5027; G06F 9/4881; G06F 9/5038; G06F 17/30424; G06F 11/1461
See application file for complete search history.

(56) References Cited

U.S. PATENT DOCUMENTS

| | | |
|---|---|---|
| 8,549,518 B1 | 10/2013 | Aron et al. |
| 8,601,473 B1 | 12/2013 | Aron et al. |
| 8,850,130 B1 | 9/2014 | Aron et al. |
| 8,997,097 B1 | 3/2015 | Aron et al. |
| 9,052,936 B1 | 6/2015 | Aron et al. |
| 9,256,374 B1 | 2/2016 | Aron et al. |
| 9,256,475 B1 | 2/2016 | Aron et al. |
| 9,354,912 B1 | 5/2016 | Aron et al. |
| 9,389,887 B1 | 7/2016 | Aron et al. |
| 9,575,784 B1 | 2/2017 | Aron et al. |

(Continued)

OTHER PUBLICATIONS

Wikipedia. "Gittins index". Dec. 7, 2015. 6 pages.

(Continued)

*Primary Examiner* — Jacob D Dascomb
(74) *Attorney, Agent, or Firm* — Vista IP Law Group, LLP

(57) ABSTRACT

Measurements comprising time-series stimuli and time-series responses of a computing platform that has executed a first set of jobs are collected over a first time period. The measurements are used to form a query-able predictive model pertaining to resource usage demand predictions for the first set of jobs. A second set of job records describe a second set of jobs to be invoked in a second time period. The predictive model is queried to determine a likelihood to complete by the predicted finish time based on resource usage demand predictions for the first set of jobs. A weighting factor related to a likelihood to complete the second set of jobs by a particular time is calculated. A reward value based on the weighting factor is assigned to respective jobs in the second set of jobs. Some of the second set of jobs are rescheduled, based on a then-current reward value.

20 Claims, 18 Drawing Sheets

(56) References Cited

U.S. PATENT DOCUMENTS

| | | | |
|---|---|---|---|
| 9,619,257 B1 | 4/2017 | Aron et al. | |
| 2006/0218551 A1* | 9/2006 | Berstis | G06F 9/4881 718/102 |
| 2008/0320482 A1* | 12/2008 | Dawson | G06F 9/5027 718/104 |
| 2010/0217651 A1 | 8/2010 | Crabtree et al. | |
| 2011/0202657 A1 | 8/2011 | Chang et al. | |
| 2012/0041914 A1 | 2/2012 | Tirunagari | |
| 2013/0086341 A1* | 4/2013 | Vasavi | G06F 11/1458 711/162 |
| 2016/0019094 A1* | 1/2016 | Habdank | G06F 9/505 718/104 |
| 2016/0224384 A1 | 8/2016 | Gokhale et al. | |
| 2016/0373377 A1 | 12/2016 | Cao et al. | |
| 2017/0031816 A1 | 2/2017 | Lee et al. | |

OTHER PUBLICATIONS

Pandelis et al. "On the optimality of the Gittins index rule for multi-armed bandits with multiple plays". Jul. 1999. 13 pages.

Deel et al. "Linear Tape File System (LTFS) Format Specification". Dec. 21, 2013. 69 pages.

Nagpal et al., "STAY-FIT: Seasonal Time series Analysis and Forecasting using Tournament Selection", 3 pages; Nutanix, Inc., San Jose, CA. USA.

Dlessner, "STAY-FIT: Getting Ready for What Is Next in Prism", Nutanix, Inc., Dec. 8, 2015, 4 pages.

U.S. Appl. No. 15/006,435, filed Jan. 26, 2016, 65 pages.

U.S. Appl. No. 15/173,577, filed Jun. 3, 2016, 102 pages.

U.S. Appl. No. 15/191,387, filed Jun. 23, 2016, 59 pages.

Non-Final Office Action dated Mar. 22, 2018 for related U.S. Appl. No. 15/191,387.

Wikipedia. "Feasible region". Nov. 16, 2015. 2 pages.

"What Is Multiobjective Optimization?" Feb. 16, 2015. 1 page. http://www.mathworks.com/help/gads/what-is-multiobjective-optimization.html.

Massimiliano Caramia et al. "Multi-objective Optimization". 2008. 27 pages. Chapter 2. Springer-Verlag London.

Non-Final Office Action dated Nov. 27, 2017 for related U.S. Appl. No. 15/160,246.

Final Office Action dated Mar. 30, 2018 for related U.S. Appl. No. 15/160,246.

* cited by examiner

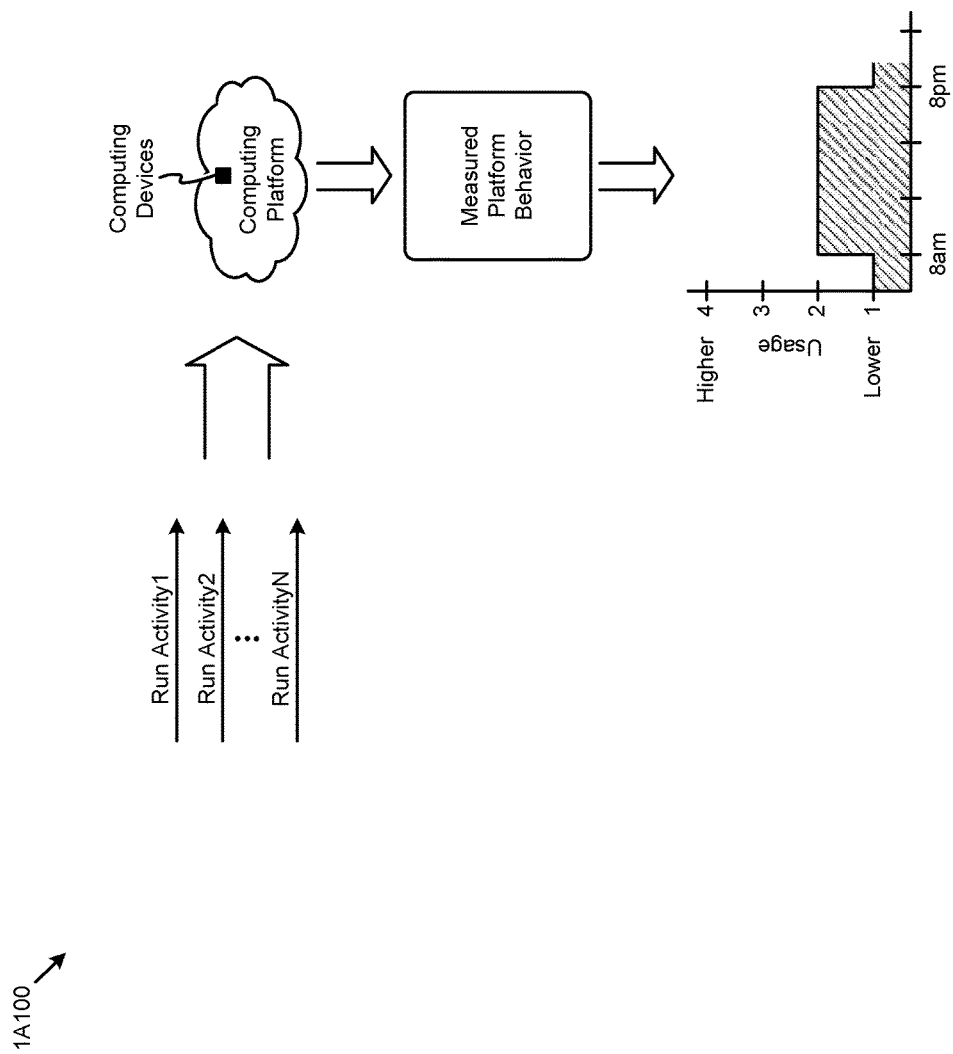
FIG. 1A1

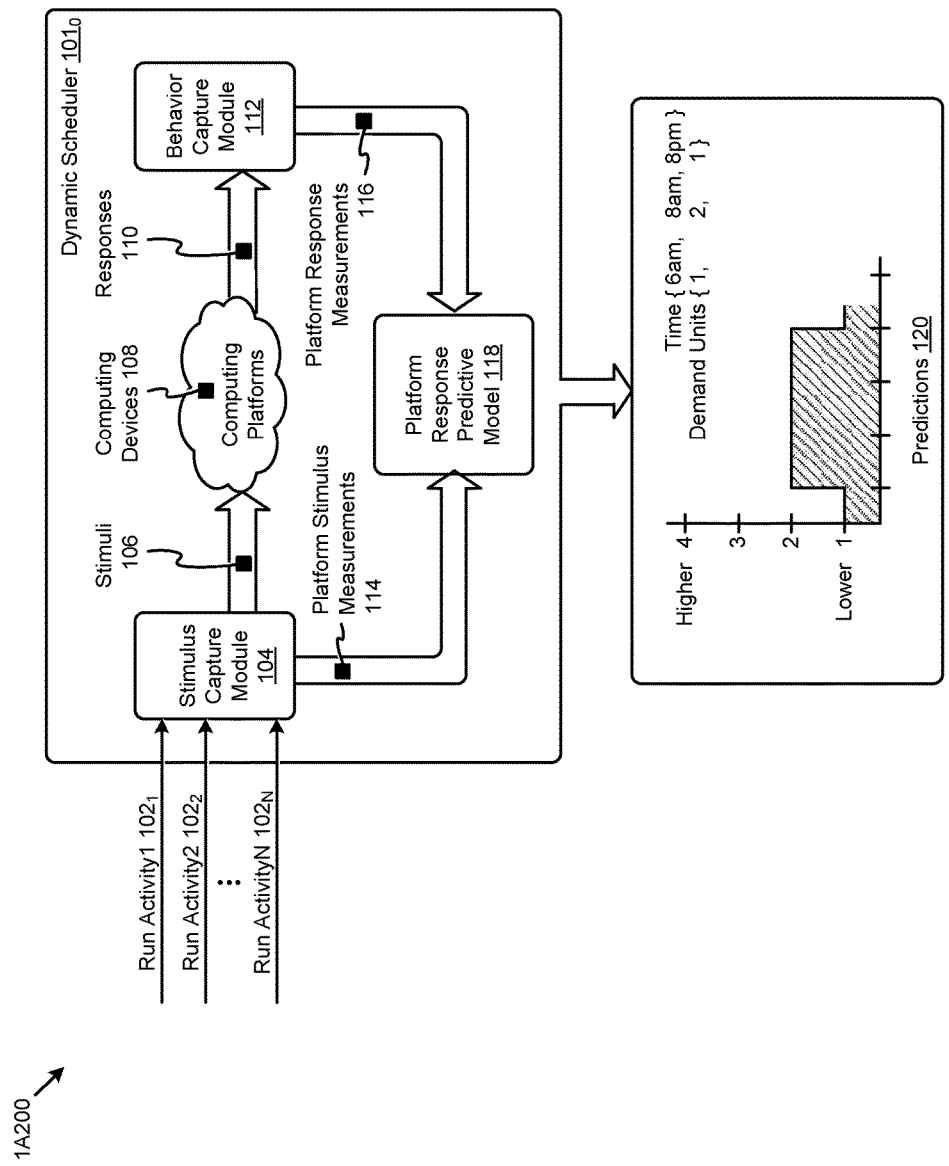
FIG. 1A2

Job Specification Data Records 127

| Job ID | Predicted CPU Load | Predicted Network I/O | Predicted Storage Block Usage | ... | Latest Finish |
|---|---|---|---|---|---|
| J1 | $V_{CPUJ1}$ | $V_{NETIOJ1}$ | $V_{BJ1}$ | | $T_3$ |
| J2 | $V_{CPUJ2}$ | $V_{NETIOJ2}$ | $V_{BJ2}$ | | $T_{10}$ |
| J3 | $V_{CPUJ3}$ | $V_{NETIOJ3}$ | $V_{BJ3}$ | | $T_{13}$ |
| ... | | | | | |
| JN | $V_{CPUJN}$ | $V_{NETIOJN}$ | $V_{BJN}$ | | $T_Z$ |

FIG. 1C

SCHEDULING COMPUTING JOBS OVER FORECASTED DEMANDS FOR COMPUTING RESOURCES

FIELD

This disclosure relates to high-performance computing, and more particularly to techniques for dynamically readjusting resource allocations to computing jobs based on changing resource availabilities.

BACKGROUND

Scheduling computing jobs (e.g., storage backup jobs) can be done when a system is "offline". Alternatively, scheduling of such jobs can be done when a system is online if there are sufficient resources available to perform the scheduling in an online fashion. In some computing environments, many jobs (e.g., backups, snapshots) might be scheduled within tight intervals (e.g., hourly, or many per hour). The scope of a backup operation as well as a frequency and/or performance level that backup jobs will complete on time can be defined in aspects of a service level agreement (SLA), which aspects in turn can be codified using measurable quantities to describe quantitative service levels. When backup jobs are run during online operation of a system being backed up, the mere action of running the backup jobs consume system resources. In many cases such resources (e.g., CPU cycles, network I/O (input/output or IO), storage space, etc.) can be consumed by backup jobs without negatively impacting the user jobs (or other existing load processing) that are performed during regular online operation of the computing platform. Given resource usage quotas or limits, backup jobs can be scheduled on top of existing load processing. In many situations the resource demands of existing load processing can be measured, and in many situations the resource demands of backup jobs can be measured. Future predictions based on past performance can be made by a predictor, and new incoming backup jobs can be scheduled over existing loads such that the backup job(s) are provided with sufficient resources (e.g., CPU time, I/O bandwidth, wall clock time, etc.) to be able to finish by a deadline (e.g., as may be specified or derived from a service level agreement).

Unfortunately, legacy forms of scheduling (e.g., just-in-time scheduling, earliest start scheduling, token-based scheduling) are very frequently wrong. For example, the future predictions might be wrong. Many legacy forms of scheduling are very frequently very wrong, at least inasmuch as a prediction is just a prediction and many events might occur between the time a prediction is made and the timeframe of the prediction. The situation is exacerbated when there are many backup jobs that need to be scheduled over many activities occurring in the foreground processing. What is needed is a way to determine an initial schedule of backup jobs, to allocate resources to those jobs, and then to reschedule and reallocate based on events that occur after the initial scheduling.

What is needed is a technique or techniques to improve over legacy and/or over other considered approaches. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure provides a detailed description of techniques used in systems, methods, and in computer program products for dynamically readjusting resource allocations to backup jobs based on changing resource availabilities, which techniques advance the relevant technologies to address technological issues with legacy approaches. More specifically, the present disclosure provides a detailed description of techniques used in systems, methods, and in computer program products for dynamically readjusting resource allocations to backup jobs based on changing resource availabilities. Certain embodiments are directed to technological solutions for continuously reassessing system resources available for backup jobs so as to prioritize one job over another without negatively impacting foreground jobs, which embodiments advance the relevant technical fields as well as advancing peripheral technical fields.

The disclosed embodiments modify and improve over legacy approaches. In particular, the herein-disclosed techniques provide technical solutions that address the technical problems attendant to static scheduling of backup jobs, which legacy techniques fail to consider predicted future events that might affect job completion times. Such technical solutions serve to reduce the demand for computer memory, reduce the demand for computer processing power, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of high-performance computing as well as advances in various technical fields related to distributed storage.

Further details of aspects, objectives, and advantages of the technological embodiments are described herein and in the following descriptions, drawings, and claims.

BRIEF DESCRIPTION OF THE DRAWINGS

The drawings described below are for illustration purposes only. The drawings are not intended to limit the scope of the present disclosure.

FIG. 1A1 exemplifies an environment in which systems that dynamically readjust resource allocations to backup jobs based on changing resource availabilities can be deployed.

FIG. 1A2 exemplifies a predictive model formation technique as used in systems that can dynamically readjust resource allocations to backup jobs based on changing resource availabilities, according to an embodiment.

FIG. 1C presents a data structure representation of computing jobs as used in systems that perform dynamic readjustment of resource allocations to backup jobs based on changing resource availabilities, according to an embodiment.

DETAILED DESCRIPTION

Figure 1B:
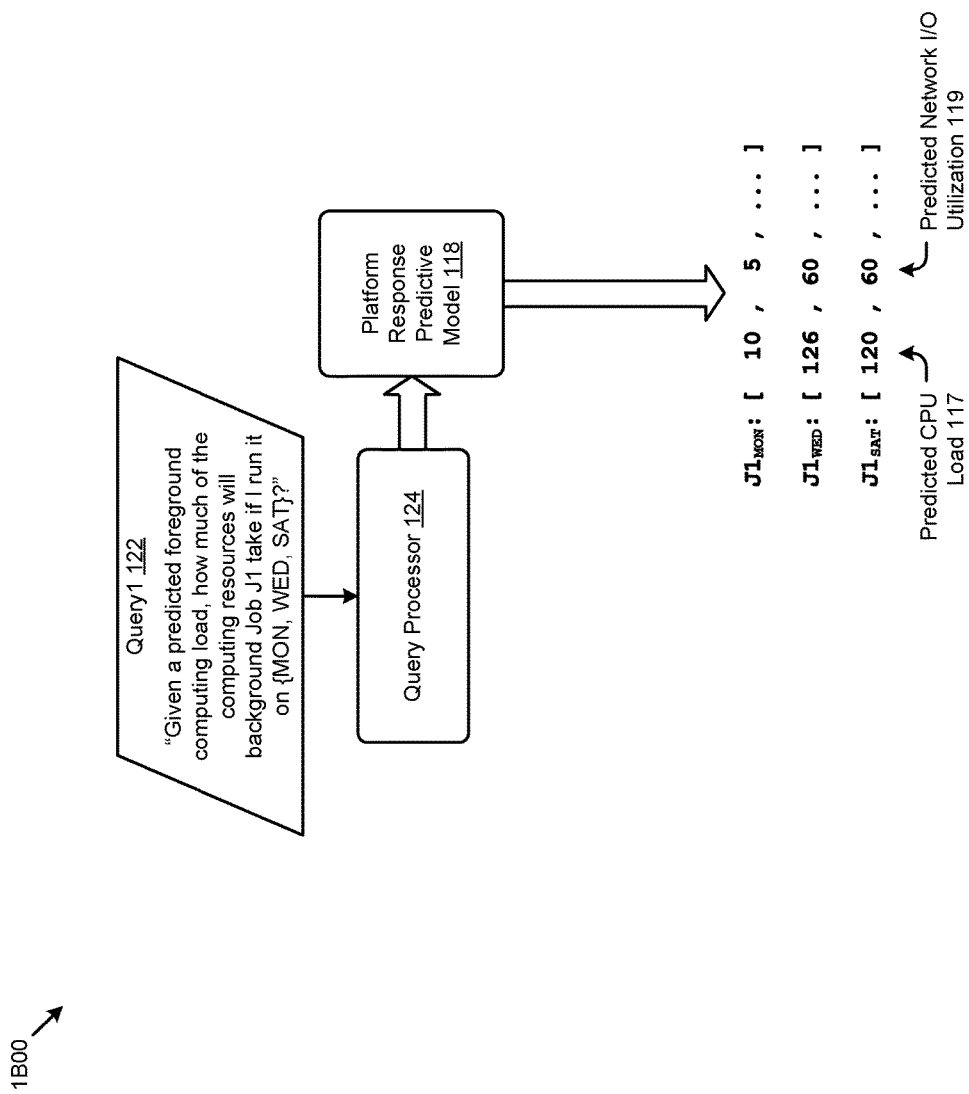
FIG. 1B depicts a predictive model resource query technique as used in systems that dynamically readjust resource allocations to backup jobs based on changing resource availabilities, according to an embodiment.

Some embodiments of the present disclosure address problems that arise from reliance on static scheduling of backup jobs without considering future events. What is needed are scheduling techniques that consider how future events might affect scheduled job completion times. Some embodiments are directed to approaches for continuously reassessing system resources available for backup jobs so as to prioritize one scheduled job over another without negatively impacting foreground computing loads. More particularly, disclosed herein and in the accompanying figures are exemplary environments, systems, methods, and computer program products for dynamically readjusting resource allocations to computing jobs based on changing resource availabilities.

Overview

Users place demands on computing resources by running their jobs. In addition to running such jobs many systems concurrently perform administrative tasks such as performing backups and/or snapshots and/or garbage collection and/or other administrative tasks. The behavior of user jobs, including seasonality or periodicity if any, can be measured over time. User demands for computing resources can be measured and analyzed for peak demands, correlation between one system variable and another system variable, specific periodicities, occurrences of events or occurrences of availabilities, etc. Further, measurements of system response (e.g., use of computing resources) and their correlation to system stimulus (e.g., the acts of running foreground jobs) can be used to generate a predictive model. Such a model can be used to predict future events (e.g., the act of starting a foreground job) and/or future resource demands (e.g., CPU utilization, network I/O (input/output or IO, etc.).

Still further, such a model can be used to predict a future foreground computing load over which any of the aforementioned backup or administrative loads can be scheduled. Doing so can have the desired effect of avoiding overloading a computing system with administrative tasks, thus avoiding situations where users might experience the effects of an overloaded system. Various scheduling techniques can be used to exploit seasonality found in the aggregation of the foreground computing loads. For example, backup jobs can be scheduled "at night" when the user load is predicted to be low. Such static scheduling works well when the predictions (e.g., of user foreground tasks demands, user job seasonality, etc.) actually come to pass.

However, many events might occur in a future timeframe that would cause a prediction to be significantly wrong. In some cases, a prediction (e.g., 20 units of CPU resources will be available between midnight and 1 AM) can be associated with a likelihood or confidence interval (e.g., such 20 units will be available only 50% of the time). Such predictions and respective likelihoods can be used to formulate a backup job schedule that matches backup job demands to predicted availabilities, and such schedules that consider resource availabilities might sometimes be carried out as scheduled. However, sometimes events or demands that occur during the processing of the backup jobs might significantly impact actual available resources and, thus, the originally predicted schedule might need to be reformulated. Such a readjustment might be done frequently (e.g., several times per day, several times per hour, etc.). Moreover, there might be many backup jobs and/or administrative jobs that contend for computing resources, and those jobs might need to be prioritized such that performance objectives are optimized so as to achieve or exceed service level agreement (SLA) parameters.

In many cases, such as is described herein, jobs, job demands for resources, resource availability, etc. can be codified into time-series representations. For example, CPU availability might be codified over a daylong period in a time-series representation such as {90% (midnight to 9 am), 15% (9 AM to 9 pm), 50% (9 pm to midnight)}.

The embodiments described herein rely in part on a predictive model. The predictive model can be queried so as to retrieve a time-series representation of system behavior while running user jobs. The retrieved time series can in turn be used to formulate an initial static schedule of a plurality of backup jobs. Retrieved data values that form the predicted time-series data include respective likelihoods, which likelihoods quantify a probability that a respective data value of the predicted time series will come to pass based on historical measurements. Such data value predictions, respective likelihoods, and uses in generating an initial schedule are shown and described as pertains to the figures. Moreover, the appended figures show and describe techniques to calculate weighting values (e.g., to determine a relative urgency of a job) and to calculate reward values (e.g., to determine a relative importance of a job in achieving SLA parameters) so as to readjust the initial schedule of any one or more of the plurality of backup jobs.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, references throughout this specification to "some embodiments" or "other embodiments" refers to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1A1 exemplifies an environment 1A100 in which systems that dynamically readjust resource allocations to backup jobs based on changing resource availabilities can be deployed. The embodiment shown in FIG. 1A1 is merely one example of such an environment.

As shown, a computing platform (e.g., a cluster) comprises any number of computing devices. Activities, possibly in the form of jobs (e.g., Activity1, Activity2, . . . , ActivityN), are executed on the computing platform using the computing devices. In some scenarios, instrumentation can be provided within or around the computing platform, which instrumentation can observe stimulus to the computing platform (e.g., the execution of jobs, etc.) and observe responses of the computing platform. As one example, the running of the jobs depicted might result in a series of measurements that can be timestamped so as to depict resource use over time. This example depicts relatively higher resource use between the hours of 8 am and 8 pm, and relatively lower resource usages at other times.

Resource usage can be observed and plotted at any level of granularity (e.g., to the hour, to the minute, to the second, etc.). Further, resources can be defined in any quantitative terms (e.g., percentage of use, sizes, I/O rates, etc.) over any dimension of any resource. When scheduling backup jobs (e.g., snapshots) on top of or in addition to the measured resource usage, some techniques avoid overloading. More specifically, some techniques seek to avoid overloading in any dimension.

In many practical deployments of computing platforms, there may be many resources and many measurable dimensions. The measured behavior can be stored over a long period of time (e.g., over many days, over many weeks, etc.). The measured behavior can be quantified into time-series representations such as can be used to form a predictive model that correlates certain stimuli to predicted responses. One possible technique for formation of a predictive model is given as shown and described as pertaining to FIG. 1A2.

FIG. 1A2 exemplifies a predictive model formation technique 1A200 as used in systems that can dynamically readjust resource allocations to backup jobs based on changing resource availabilities.

The technique employs a dynamic scheduler $101_0$ to dynamically readjust resource allocations to backup jobs based on changing resource availabilities.

As shown, stimuli 106 is applied to the computing platform (e.g., a computing node) or platforms (e.g., an array or collection of computing nodes). The computing devices 108 serve to execute the input jobs (e.g., Activity1 $102_1$, Activity2 $102_2$, . . . , ActivityN $102_N$). Before, during and after execution, responses 110 are measured. The stimuli and the responses can be codified into a time-series representation by one or more instrumentation modules (e.g., stimulus capture module 104 and behavior capture module 112). Platform stimulus measurements 114 (e.g., job name, process ID, process name, "chron job" schedule, etc.) and platform response measurements 116 (e.g., CPU usage, memory usage, network TO usage, etc.) can be collected, correlated, and formed into a query-able platform response predictive model. Such a platform response predictive model 118 can output charts and/or time series data and/or other types of responses to a query, possibly including predictions 120, as shown. The correspondence between a time and a value can be captured using any known technique, such as using a pair of vectors comprising values.

FIG. 1B depicts a predictive model resource query technique 1B00 as used in systems that dynamically readjust resource allocations to backup jobs based on changing resource availabilities. As an option, one or more variations of predictive model resource query technique 1B00 or any aspect thereof may be implemented in the context of the architecture and functionality of the embodiments described herein. The predictive model resource query technique 1B00 or any aspect thereof may be implemented in any environment.

The aforementioned platform response predictive model 118 can operate in conjunction with a query processor 124. The query processor can in turn accept queries in various forms. As shown, query1 122 asks a compound query given as, "Given a predicted foreground computing load, how much of the computing resources will background Job J1 take if I run it on {MON, WED, SAT}?". The platform response predictive model 118 can return a prediction or, as shown, compound predictions in accordance with the compound query. In the example, the predicted CPU load 117 is "10 units" (if run on MON), "126 units" (if run on WED), and "120 units" (if run on SAT).

Such predictions can be made over any prediction horizon, and can involve any single or combinations of observations (e.g., predicted CPU load 117, predicted network I/O utilization 119, storage quantities, etc.) that had been taken in any previous time period. Such predictions can be assembled into a data structure that can be used by any of a wide variety of scheduling techniques.

FIG. 1C presents a data structure representation 1C00 of computing jobs as used in systems that perform dynamic readjustment of resource allocations to backup jobs based on changing resource availabilities. As an option, one or more variations of data structure representation 1C00 or any aspect thereof may be implemented in the context of the architecture and functionality of the embodiments described herein. The data structure representation 1C00 or any aspect thereof may be implemented in any environment.

The embodiment shown in FIG. 1C is merely one example. As shown, the data structure is formed of rows of data, each row forming a job specification data record 127, where each record comprises a job ID (e.g., J1, J2, J3, ..., JN), a predicted CPU load value (e.g., $V_{CPUJ1}$, $V_{CPUJ2}$, $V_{CPUJ3}$, ..., $V_{CPUJN}$), a predicted network I/O value (e.g., $V_{NETIOJ1}$, $V_{NETIOJ2}$, $V_{NETIOJ3}$, ..., $V_{NETIOJN}$), a predicted storage block usage value (e.g., $V_{BJ1}$, $V_{BJ2}$, $V_{BJ3}$, ..., $V_{BJN}$), and a specification pertaining to a latest finish time (e.g., $T_3$, $T_{10}$, $T_{13}$, ... $T_Z$). Other dimensions may be included in various embodiments of a job specification data record 127.

Figure 1D:
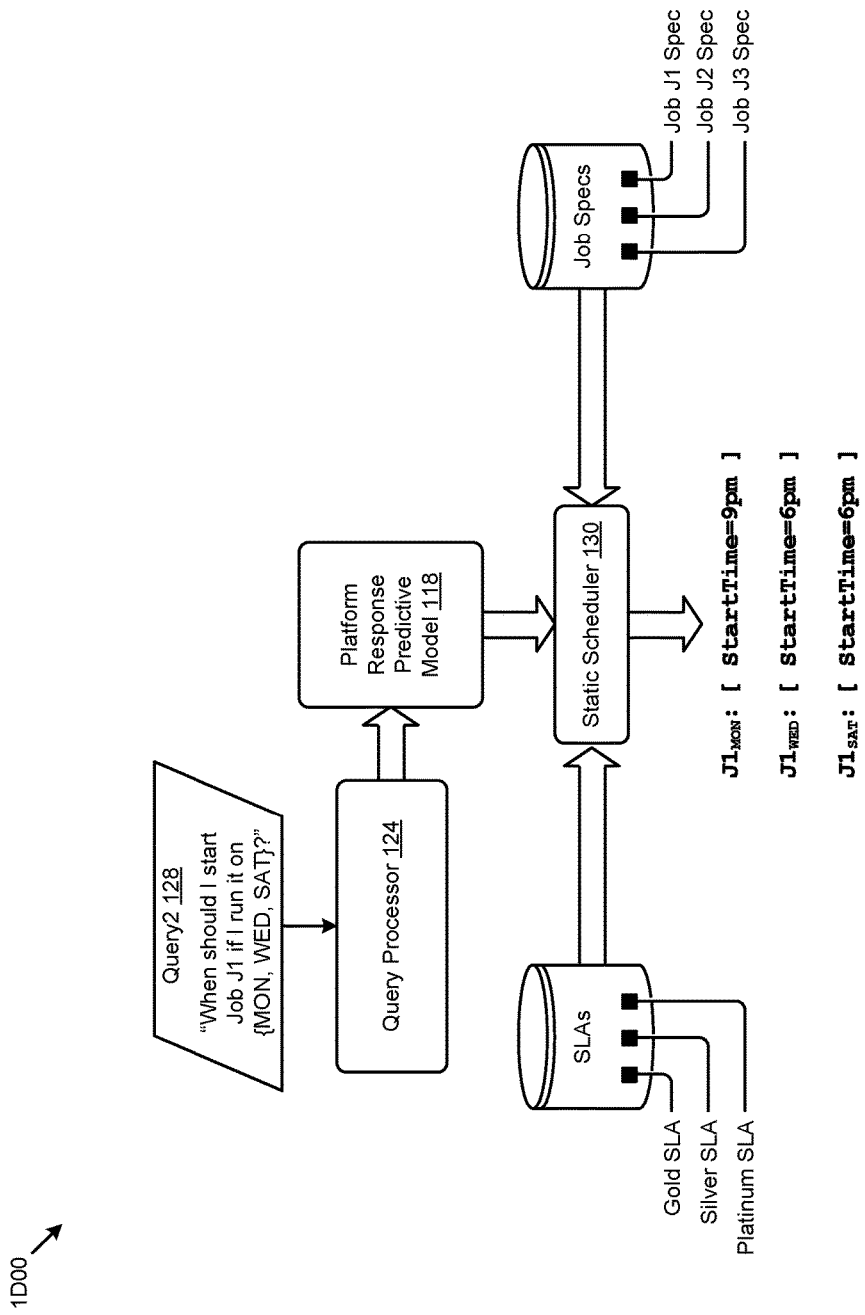
FIG. 1D depicts a schedule query technique as used in systems that dynamically readjust resource allocations to backup jobs based on changing resource availabilities, according to an embodiment.

FIG. 1D depicts a schedule query technique 1D00 as used in systems that dynamically readjust resource allocations to backup jobs based on changing resource availabilities. As an option, one or more variations of schedule query technique 1D00 or any aspect thereof may be implemented in the context of the architecture and functionality of the embodiments described herein. The schedule query technique 1D00 or any aspect thereof may be implemented in any environment.

The shown compound schedule query2 128 is given as, "When should I start Job J1 if I run it on {MON, WED, SAT}?". The query processor 124 uses the platform response predictive model 118 to generate compound query results, which are in turn used by the shown static scheduler 130. Additionally, such a static scheduler can accept inputs in the form of job specs as well as demands, guarantees or constraints as may be codified into service level agreements (SLAs). Differing combinations and/or values of the aforementioned demands, guarantees, or constraints can be named with names such as "Gold SLA", "Silver SLA" or "Platinum SLA". Any of the combinations of inputs into the static scheduler can be used to form a static schedule that can be used as an initial schedule, which in turn can be used as a starting point before applying the herein-described techniques for dynamic readjustments of resource allocations to backup jobs.

Figure 1E:
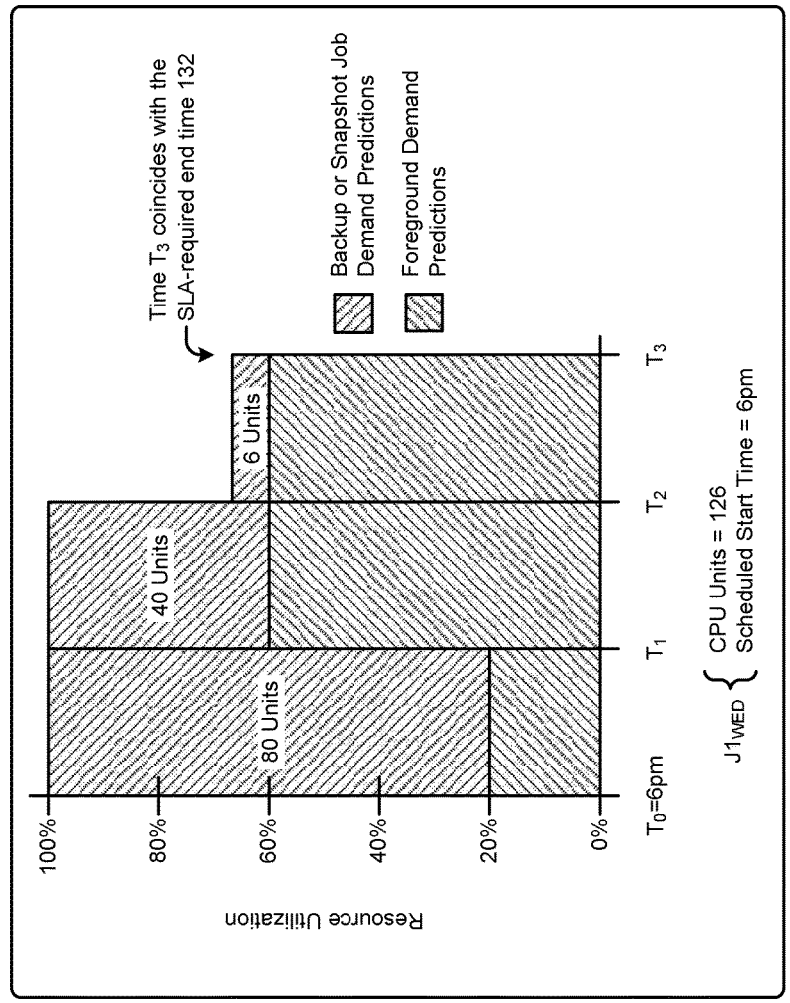
FIG. 1E depicts results of an initial schedule generation technique as used in systems that dynamically readjust resource allocations to backup jobs based on changing resource availabilities, according to an embodiment.

FIG. 1E depicts results of an initial schedule generation technique 1E00 as used in systems that dynamically readjust resource allocations to backup jobs based on changing resource availabilities. As an option, one or more variations of initial schedule generation technique 1E00 or any aspect thereof may be implemented in the context of the architecture and functionality of the embodiments described herein. The initial schedule generation technique 1E00 or any aspect thereof may be implemented in any environment.

As indicated above, an SLA can be composed of demands, guarantees, or constraints. In some cases, an SLA may specify completion of a job by a certain time or day, or on a certain periodic schedule. In the example of FIG. 1E, the shown time $T_3$ coincides with the SLA-required end time 132 for Job "J1" if performed on Wednesday (e.g., $J1_{WED}$). Moreover, in this example, $J1_{WED}$ had been predicted to consume 126 units of CPU resources (e.g., where a unit is roughly equivalent to one percent of CPU resource utilization).

In this particular static scheduling technique, the resource units are apportioned over a series of available time slots (e.g., the slot between $T_0$ and $T_1$, the slot between $T_1$ and $T_2$, etc.). The available time slots refer to the availability of a particular resource that has headroom beyond the predicted resource requirements of a set of foreground demand predictions (as shown). Given a start time at $T_0$ and a scheduling rule that does not schedule resources in excess of 100%, only 80 units of $J1_{WED}$ can be scheduled in the first slot. An additional 40 units can be scheduled in the second slot, and the remainder (6 units) can be scheduled into the third slot. If the actual operating conditions turn out to be substantially as predicted, then the job $J1_{WED}$ would finish in the third time slot—likely in sufficient time to meet or exceed the SLA-required end time of $T_3$.

The static scheduling technique of FIG. 1E is merely one possible static scheduling technique. Other static scheduling techniques are given elsewhere herein.

Figure 1F:
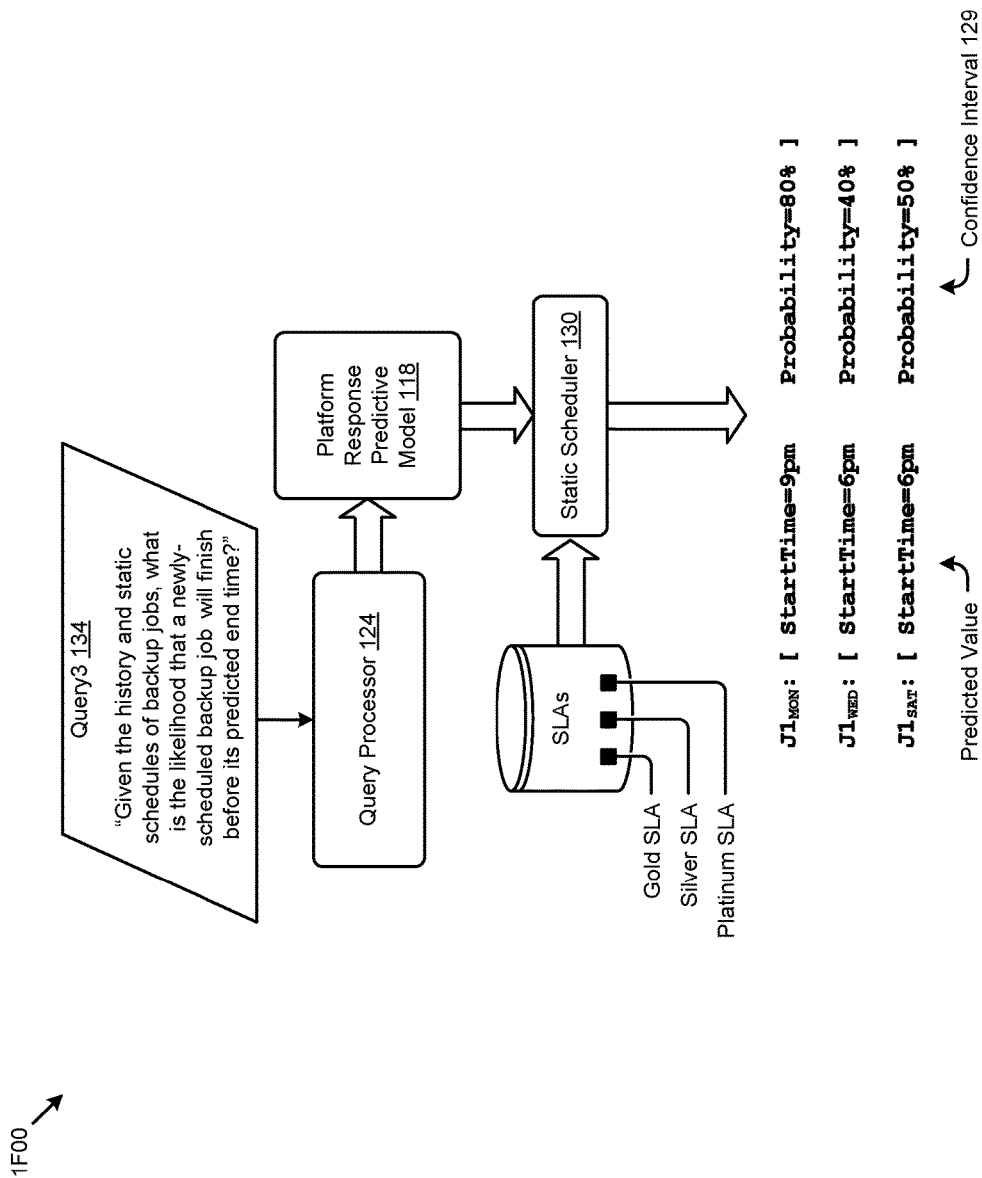
FIG. 1F depicts a confidence interval query technique as used in systems that dynamically readjust resource allocations to backup jobs based on changing resource availabilities, according to an embodiment.

FIG. 1F depicts a confidence interval query technique 1F00 as used in systems that dynamically readjust resource allocations to backup jobs based on changing resource availabilities. As an option, one or more variations of confidence interval query technique 1F00 or any aspect thereof may be implemented in the context of the architecture and functionality of the embodiments described herein. The confidence interval query technique 1F00 or any aspect thereof may be implemented in any environment.

As indicated in the discussion of FIG. 1E, if the actual operating conditions under which job $J1_{WED}$ executes do indeed turn out to be substantially as predicted, then the job $J1_{WED}$ would finish in the third time slot. However, predictions using a predictive model are often not guaranteed to be accurate predictions. In many use cases of predictive models, the model provides a confidence interval for any one or more predictions. In the example shown, a predictor and static scheduler suggested a start time for job $J1_{WED}$ such that job $J1_{WED}$ would complete before its constrained end time.

Strictly as an example, an IT manager might want to know the answer to the question, "Given the history and static schedules of backup jobs, what is the likelihood that a newly-scheduled backup job will finish before its predicted end time?" (query3 134). The IT manager might further want to know the degree of confidence in the answer given by the predictor. To answer the confidence question, the predictor calculates and outputs a confidence interval 129, expressed as a probability or likelihood that job $J1_{WED}$ would complete before its constrained end time. Such a confidence interval can be used for dynamic readjustment of resource allocations to backup jobs based on changing resource availabilities. Schedule changes or other dynamic readjustments of resource allocations to backup jobs can make changes from an initial schedule, which initial schedule can be formed using any know technique for static scheduling, some of which static scheduling techniques are considered when applying static scheduling techniques to a set of backup jobs that run concurrently with foreground computing loads.

Figure 2A:
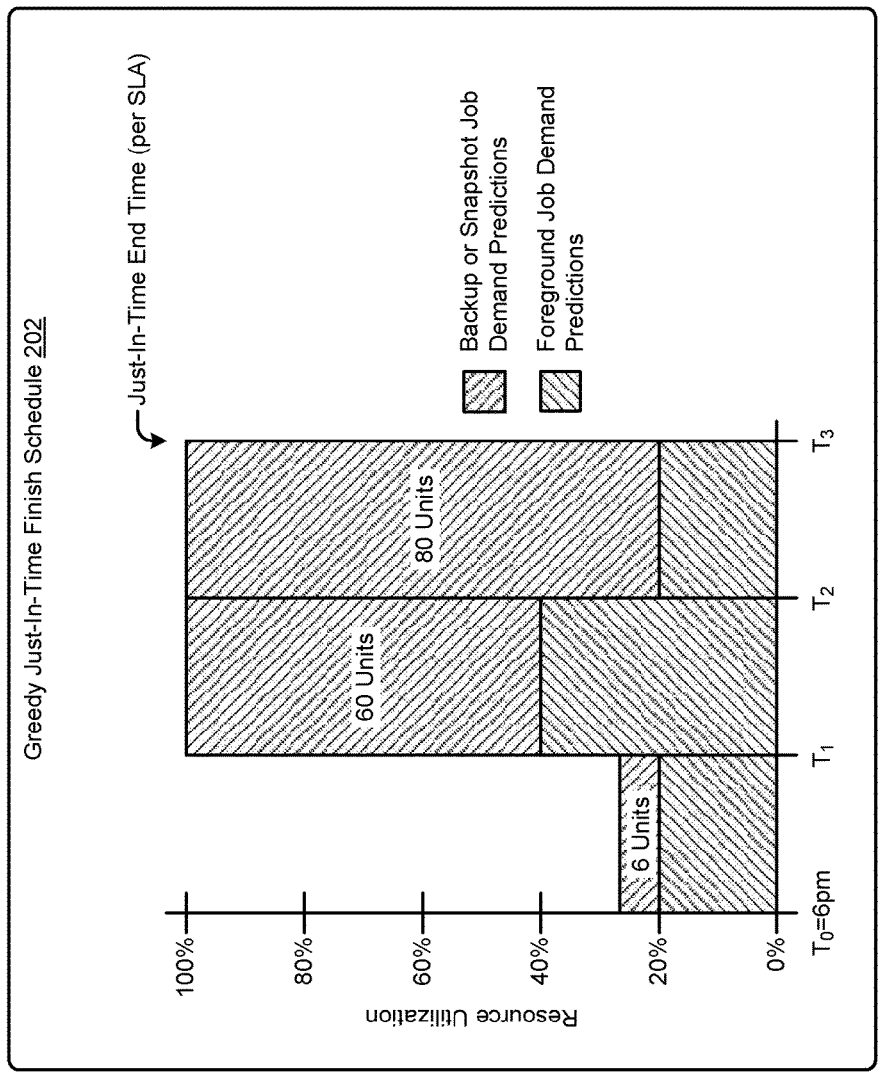
FIG. 2A, FIG. 2B, and FIG. 2C depict results of applying static scheduling techniques to a set of backup jobs that run concurrently with foreground computing loads, according to an embodiment.
Figure 2B:
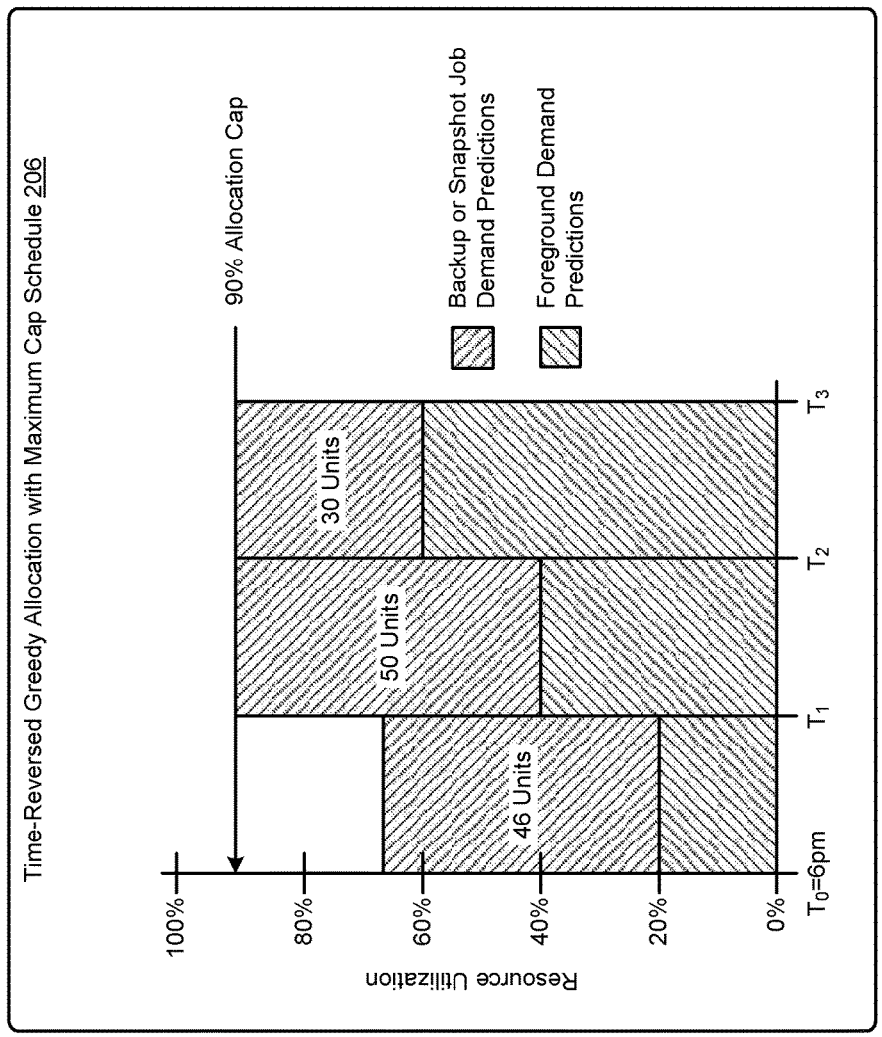
Figure 2C:
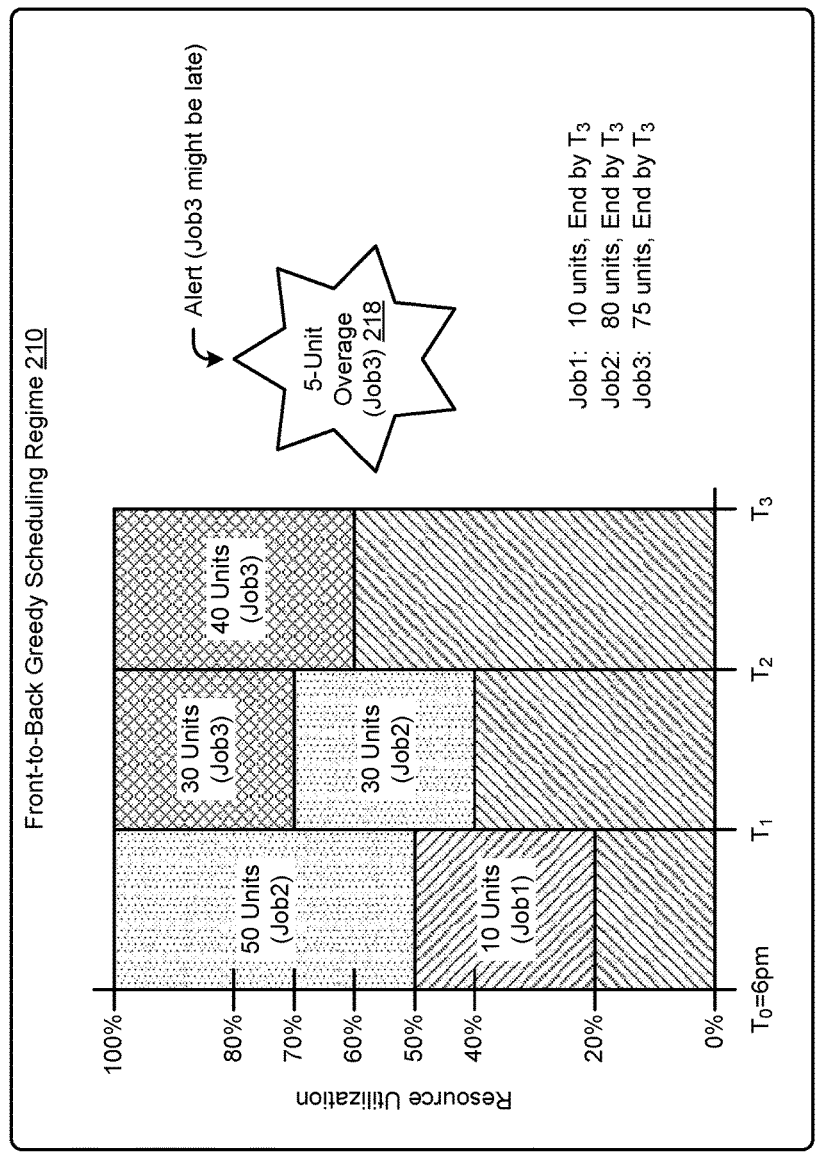

FIG. 2A, FIG. 2B, and FIG. 2C depict the results of applying static scheduling techniques to a set of backup jobs that run concurrently with foreground computing loads. As an option, one or more variations of static scheduling techniques of FIG. 2A, FIG. 2B, and FIG. 2C or any aspect thereof may be implemented in the context of the architecture and functionality of the embodiments described herein. The static scheduling techniques or any aspect thereof may be implemented in any environment.

The embodiments shown in FIG. 2A, FIG. 2B, and FIG. 2C are merely examples. FIG. 2A depicts a greedy just-in-time finish schedule 202 that maximally-packs resource allocations based on predicted available resources. As shown, given 126 demanded resource units, 80 units are packed into the time slot from time $T_2$ to time $T_3$ (e.g., to finish just in time), 60 units are packed into the time slot beginning at time $T_1$, and the remaining 6 units are packed into time slot $T_0$.

FIG. 2B depicts a time-reversed greedy allocation with maximum cap schedule 206. In this scheduling scheme, resource units are allocated to the to-be-scheduled backup job beginning from the job's end time, but only to some specified maximum cap. In this example the cap is 90%, thus giving 10% headroom for uncertainty. The example of a maximum cap is merely one example, and other sorts of threshold can be quantitatively defined so as to be able to calculate if a maximum has been or is predicted to be exceeded, or if a minimum has been or is predicted to be missed. Other thresholds can be quantitatively defined so as to be able to calculate if threshold has been or is predicted to be breached (e.g., with a confidence interval or other value pertaining to a likelihood of breaching the threshold).

Multiple backup jobs can be scheduled on top of one another, and further on top of a set of predictions of foreground demands. FIG. 2C depicts a front-to-back greedy scheduling regime 210. As shown, all 10 units of Job1 are allocated into the $T_0$ to $T_1$ time slot, leaving a predicted 50 units available in that time slot, which is consumed when 50 units are allocated to Job2 in that time slot, leaving 30 more units to be allocated to Job2. Even after allocating greedily to the remaining demands of the remaining jobs, Job3 cannot be completed by its end time of $T_3$. As shown, there are five units of resource utilization that Job3 needs to complete. Depending on the SLA it might be late (overage indication 218). For example, if the SLA specifies "100% completion of backup jobs by the scheduled time" (e.g., referring to a Gold SLA), then job J3 would be deemed to be late. However, if the SLA specifies a more relaxed specification such as "80% of the time the backup jobs are to complete by the scheduled time" (e.g., a Silver SLA), then even though job J3 runs over its scheduled completion time, it still might fall into the acceptable relaxed range.

This schedule is formed over a set of predicted foreground demands, which predicted foreground demands may or may not be accurate in fact during the timeframe $T_0$ to $T_3$. Although the multiple-job schedule of FIG. 2C indicates that the end time for job "J3" would not be met, that schedule need not be automatically discarded as infeasible. Techniques such as are described herein can use an initial schedule, even if deemed infeasible as a starting point, and then readjusting resource allocations to the backup jobs based on changing resource availabilities.

Figure 3:
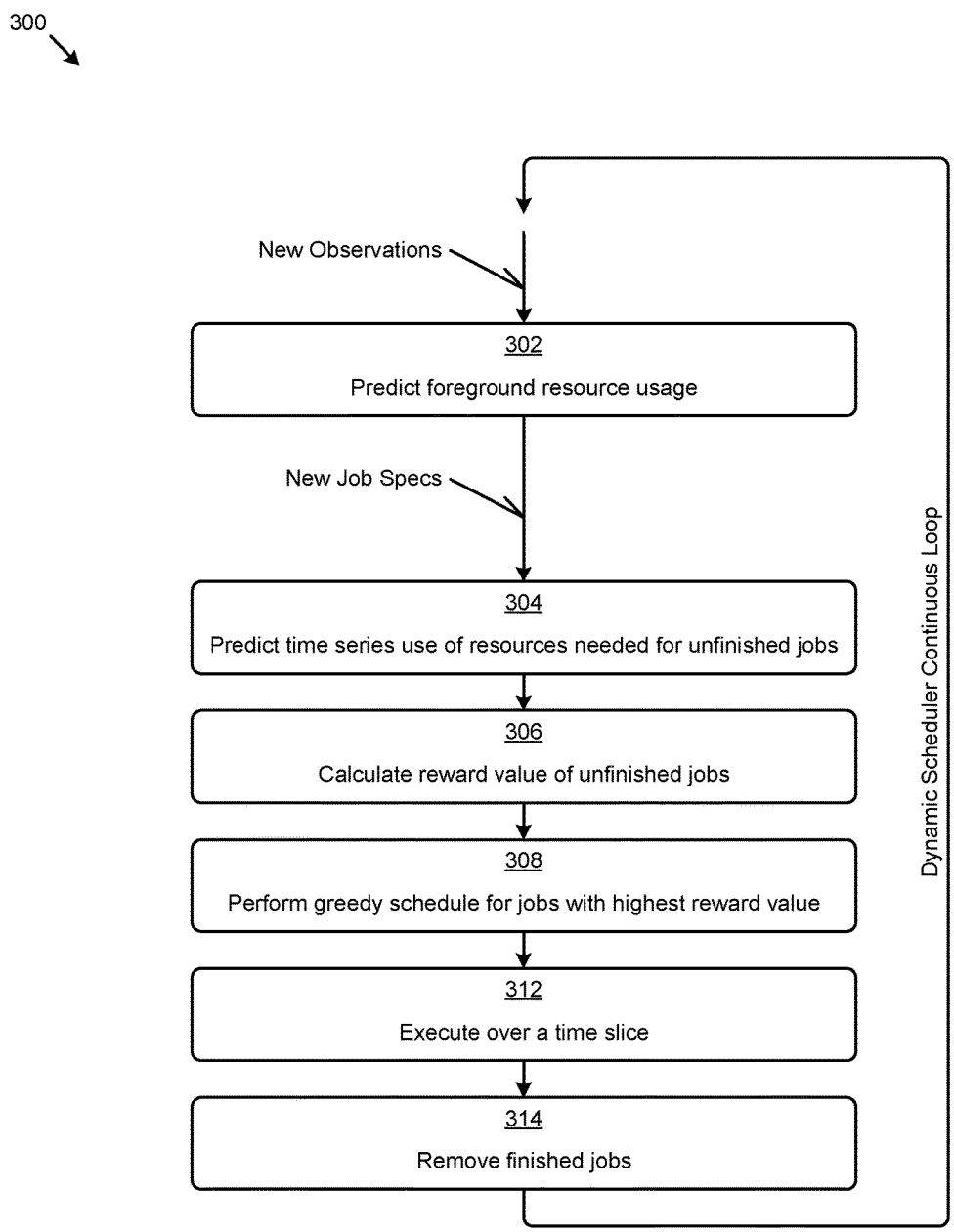
FIG. 3 presents a flowchart that implements dynamic readjustment of resource allocations to backup jobs based on changing resource availabilities, according to an embodiment.

FIG. 3 presents a flowchart 300 that implements dynamic readjustment of resource allocations to backup jobs based on changing resource availabilities. As an option, one or more variations of flowchart 300 or any aspect thereof may be implemented in the context of the architecture and functionality of the embodiments described herein. The flowchart 300 or any aspect thereof may be implemented in any environment.

The shown flowchart includes predictions of foreground resource usage (step 302). Such predictions can be recalculated anytime that new observations or other prediction data is received. When foreground resource usage has been predicted, the flowchart depicts readiness to predict a time-series usage model of resources needed to complete any unfinished backup jobs (step 304). Any static allocation or static scheduling techniques can be used to form a time-series prediction of resources needed to complete any particular backup job.

Additional job specs (e.g., including respective end times) can arrive at any moment into processing for step 304, and any such jobs, even if not started, can be considered as unfinished. Processing moves to a step for calculating a reward value for the unfinished jobs (step 306). A reward value can be calculated based on performance to a particular SLA (e.g., achieving predicted performance to a Gold SLA or Platinum SLA might have a higher reward than achieving predicted performance to a Silver SLA). Processing moves to the next step (e.g., step 308) that iterates through jobs that have the highest reward value, and iteratively performs greedy scheduling. The performance of the processing of step 308 might modify some or all (or none) of the schedules for the backup jobs. Such backup jobs can be tagged (e.g., in the operating system scheduler) such that they consume approximately the quantity of resources as determined by the iteratively performed greedy scheduling. Consumption of the allocated resources occurs during a time slice (step 312), over which time slice some jobs may finish. The shown step 314 serves to remove finished backup jobs from further consideration.

Meanwhile, new observations may have come in (see the new observations going into step 302), and new job specs may have come in (see the new job specs going into step 304). As can be appreciated, each entry into step 304 serves to recalculate a time series of resource demands for the unfinished jobs. Furthermore, since the time has advanced, and since it is possible that the predictions were not precisely true-to-fact over the previous time slices, it might be that in each pass through the shown step 306, a different job will be emerge as having the highest reward.

In some scenarios, quantities that can be used to optimize scheduling can be formalized as in the following equations. Specifically, consider the problem of scheduling two jobs on a machine. Suppose Job i (where i=1 for Job1, i=2 for Job2) takes time ti and, on completion, gives a respective reward ri. Determine how to order them, so as to maximize total discounted reward. Observe the following comparison:

$$r_1\gamma^{r_1}+r_2\gamma^{r_1+r_2} \text{ vs } r_2\gamma^{r_2}+r_1\gamma^{r_1+r_2}$$

Scheduling Job1 before Job2 would yield a greater reward if:

$$\frac{\gamma^{r_1}}{1-\gamma^{r_1}}r_1 > \frac{\gamma^{r_2}}{1-\gamma^{r_2}}r_2 \qquad \text{(EQ. 1)}$$

One possible objective is to determine a schedule that maximizes an expected reward subject to conditions (EQ. 3) where R is given by (EQ. 2) and:

$$R_i(t_i) = \begin{cases} f_i(t_i) & \text{if } 0 \le t_i \le o_i \\ f_i(o_i) & \text{if } t_i > o_i \end{cases} \quad \text{(EQ. 2)}$$

$$\text{Maximize} \sum_{i=1}^{n} R_i(t_i) \quad \text{(EQ. 3]}$$

subject to $0 \le t_i \le o_i$, $i = 1, \ldots, n$ $$\mathcal{R} = E\left\{\sum_{i=0}^{\infty} \beta^i R_{k(i)}(x_{k(i)}(t))\right\} \quad \text{(EQ. 4)}$$

where: $\beta$, $0<\beta<1$ is a fixed discount factor.

The reward can be used to calculate a Gittins index as in equation EQ. 5:

$$v_i(x_i) = \max_{\tau>0} \frac{E\left\{\sum_{t=0}^{\tau-1} \beta^t R_i(x_i(t)) \mid x_i(0) = x_i\right\}}{E\left\{\sum_{t=0}^{\tau-1} \beta^t \mid x_i(0) = x_i\right\}}, \quad \text{(EQ. 5)}$$

The reward function is based on how much the job is delayed and how close it is to its deadline. The quantity R is positive if a job is finished before its deadline and a job is negative if it misses the deadline. The reward function can be further weighted based on multiple dimensions. For example, multiple dimensions can be quantized based on an average of CPU consumption and/or network consumption and/or storage IO consumption pertaining to scheduling a job at a given time.

In one embodiment, a weight for a particular job can be expressed as the sum (over all considered utilization dimensions) of a respective (e.g., per dimension) quantity of free resources in that dimension divided by the forecasted demand of the respective dimension.

This and other embodiments for implementing dynamic readjustment of resource allocations to backup jobs based on changing resource availabilities can be described in a flow diagram.

Figure 4:
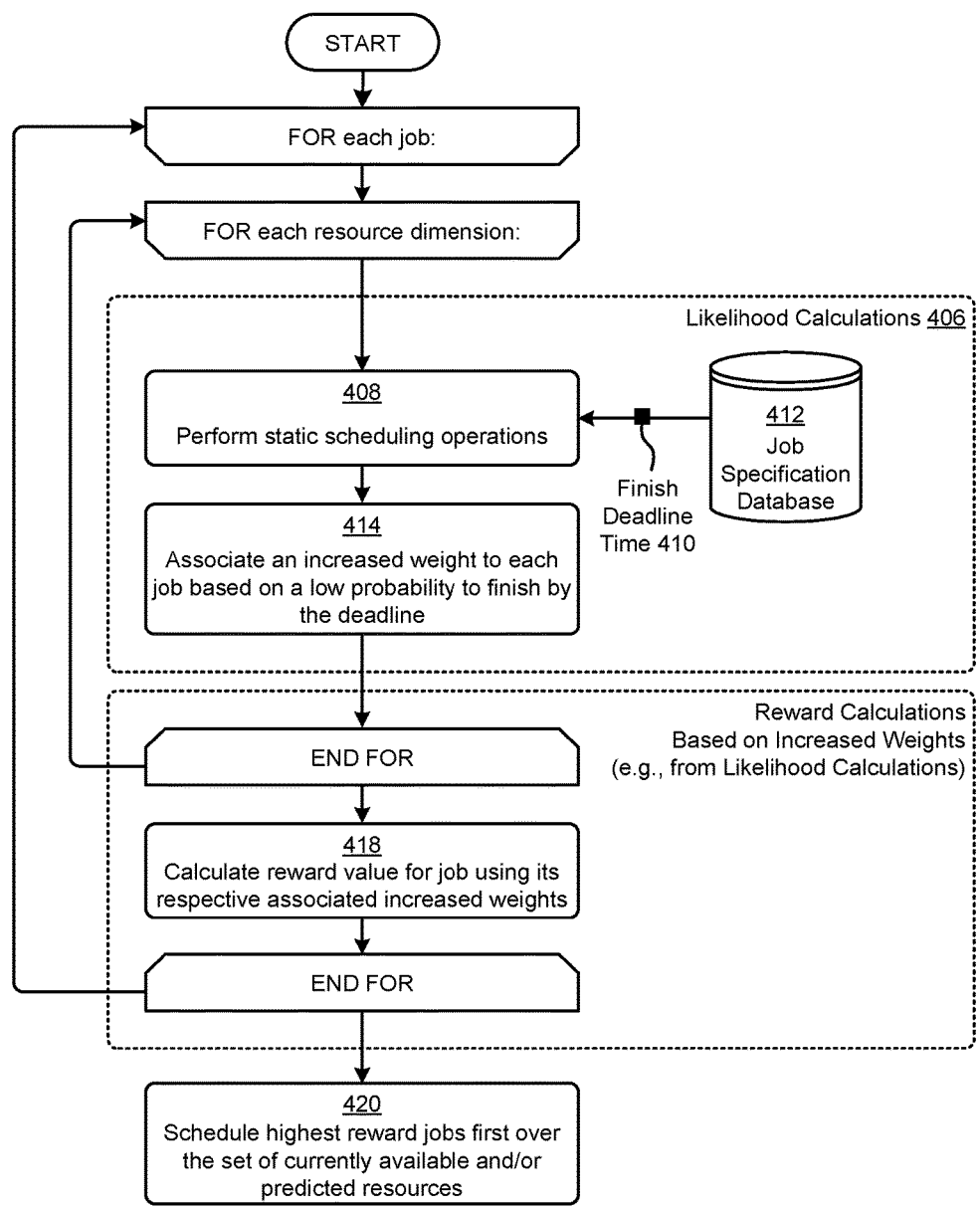
FIG. 4 presents a flow diagram that implements dynamic readjustment of resource allocations to backup jobs based on changing resource availabilities, according to an embodiment.

FIG. 4 presents a flow diagram 400 that implements dynamic readjustment of resource allocations to backup jobs based on changing resource availabilities. As an option, one or more variations of flow diagram 400 or any aspect thereof may be implemented in the context of the architecture and functionality of the embodiments described herein. The flow diagram 400 or any aspect thereof may be implemented in any environment.

The embodiment shown in FIG. 4 includes a technique to perform likelihood calculations 406 over an arbitrary number of resource dimensions (e.g., CPU units, network I/O, storage space, etc.). For example, for each resource dimension there is a predictable demand by a job, and that predictable demand has a respective confidence interval or likelihood of accuracy. A set of static scheduling operations (step 408) use a job specification database 412 to retrieve a time-to-finish value for each job (finish deadline time 410) to perform a static schedule of the particular job at hand for each resource dimension. Jobs that have a calculated relatively lower probability to complete by their respective assigned finish deadline times are assigned a respective weighting factor that is given in relationship to the calculated relatively lower probability. Such a weighting factor assigned to a job serves to influence the reward value that is calculated in subsequent steps. Specifically, and as shown, when all of the then-current jobs have been statically scheduled (step 408), and all of the then-current jobs have been assigned a weight that is commensurate to a probability to finish by respective finish deadline times (step 414), then the set of jobs can be rescheduled such the that highest reward jobs (reward calculation step 418 that calculates reward values based on the increased weights) are scheduled first (e.g., in a greedy fashion) over the set of then-current resources (step 420).

Performing dynamic scheduling serves to reapportion then-current resource demands to the then-current resources. Even in the face of bad static scheduling decisions (e.g., that might emerge merely due to the order of selection of jobs to schedule), use of scheduling techniques such that jobs that are scheduled first are jobs that score high in combinations of relative characteristics, the relative characteristics being (1) least likely to complete on time and (2) highest reward.

Figure 5A:
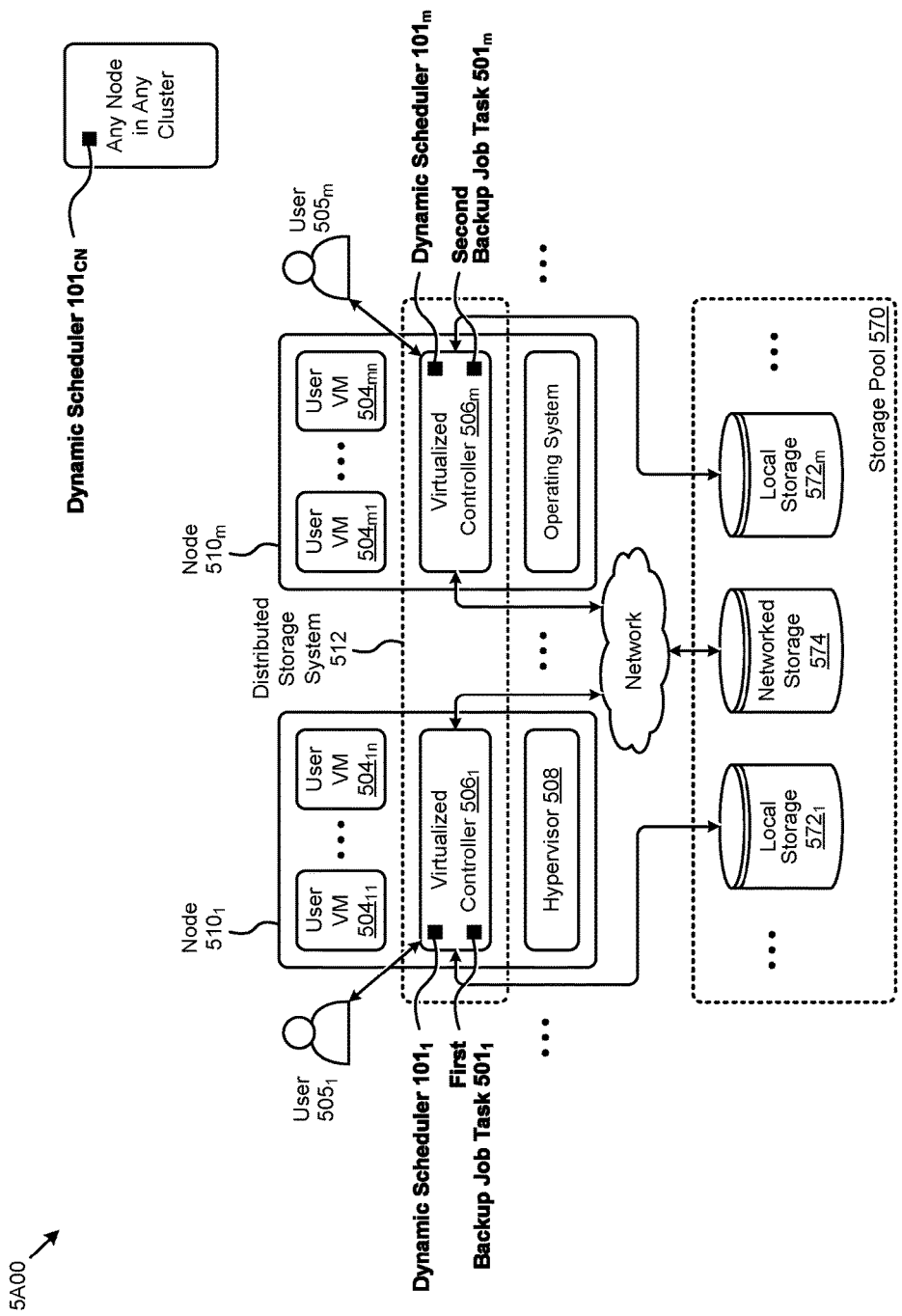
FIG. 5A and FIG. 5B present environments in which embodiments of the present disclosure can operate.

FIG. 5A presents an environment 5A00 in which embodiments of the present disclosure can operate. As an option, one or more variations of environment 5A00 or any aspect thereof may be implemented in the context of the architecture and functionality of the embodiments described herein.

The environment 5A00 shows various components associated with the distributed storage system 512 that can be managed by one or more administrators according to the herein disclosed techniques. Specifically, the environment 5A00 can comprise multiple nodes (e.g., node $510_1$, . . . , node $510_m$) that have multiple tiers of storage in a storage pool 570. For example, each node can be associated with one server, multiple servers, or portions of a server. The multiple tiers of storage can include storage that is accessible through a network, such as a networked storage 574 (e.g., a storage area network (SAN)). The storage pool 570 can also comprise one or more instances of local storage (e.g., local storage $572_1$, . . . , local storage $572_m$) that is within or directly attached to a server and/or appliance associated with the nodes. Such local storage can include solid state drives (SSDs), hard disk drives (HDDs), and/or other storage devices.

Each node can run virtualization software (e.g., VMware ESXi, Microsoft Hyper-V, RedHat KVM, Nutanix AHV, etc.) that includes a hypervisor. For example, a hypervisor 508 might correspond to VMware ESXi software, or a hypervisor 508 might correspond to Nutanix AHV software. Such hypervisors can manage the interactions between the underlying hardware and one or more user VMs (e.g., user VM $504_{11}$, . . . , user VM $504_{1n}$, user VM $504_{m1}$, . . . , user VM $504_{nm}$) that run client software.

An instance of a virtualized controller can be used to manage storage and I/O activities. Multiple instances of a virtualized controller (e.g., virtualized controller $506_1$, . . . , virtualized controller $506_m$) coordinate within a cluster to form the distributed storage system 512 which can, among other operations, manage the storage pool 570. The virtualized controllers might run as virtual machines above the hypervisors on the various servers. When the virtualized controllers run above the hypervisors, varying virtual machine architectures and/or hypervisors can operate with the distributed storage system 512. In some cases a virtualized controller runs as a container on top of an operating system (as shown), where the virtualized controller does not rely on the existence of, or cooperation with, a hypervisor. The architecture of FIG. 5A facilitates efficient scaling of the distributed computing and/or storage platform.

In one or more embodiments, one or more instances of the dynamic scheduler disclosed herein can be implemented in the distributed storage system 512. Specifically, an instance of the dynamic scheduler $101_1$ can be implemented in the virtualized controller $506_1$, and another instance of the dynamic scheduler $101_m$ can be implemented in the virtualized controller $506_m$. In some embodiments the dynamic scheduler can be implemented in any node in any cluster from among 1-to-N clusters (e.g., dynamic scheduler $101_{CN}$).

Figure 5B:
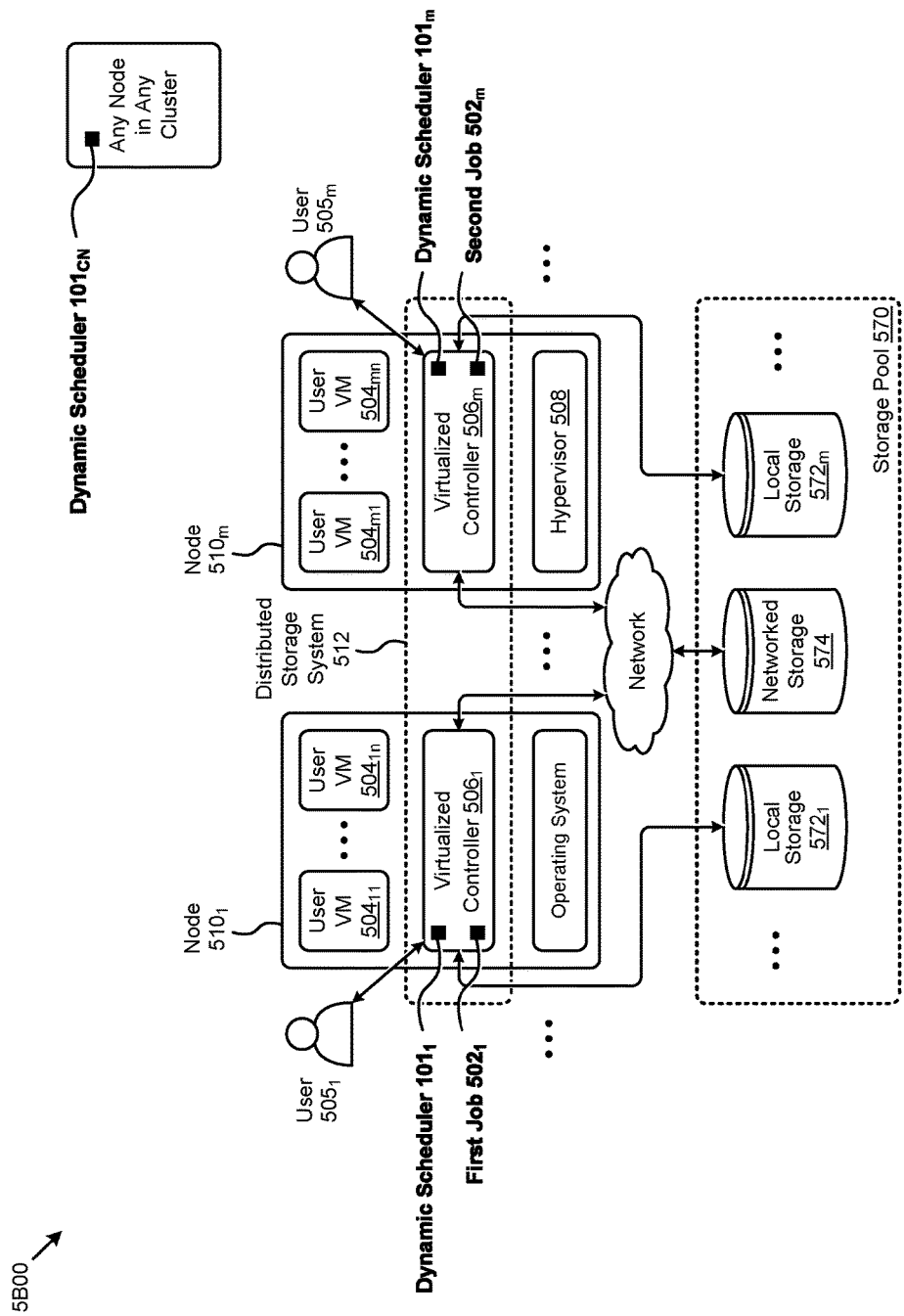

In various embodiments including the embodiments depicted in FIG. 5A and FIG. 5B, the dynamic scheduler is implemented within or in cooperation with a virtualized controller. As such, the dynamic scheduler can listen to streams of storage I/O that arise from any one or more of the shown user virtual machines hosted on a particular node. Such storage I/O includes any storage commands and/or data. Actions corresponding to storage commands are performed over storage devices in the storage pool 570. Data corresponding to performance of storage commands is sent to or retrieved from storage devices (e.g., local storage or networked storage) in the storage pool.

Streams of storage I/O can arise from any one or more of the shown user virtual machines hosted on a particular node. Streams of storage I/O can be monitored and processed any backup job. A backup job or other sort of background job can be run on a single node as a virtual machine or as (or in) a container, or a backup job can be partitioned and deployed as multiple tasks (e.g., within or as a virtual machine or container) that are partitioned and coordinated to operate over multiple nodes (e.g., first backup job task $501_1$ and second backup job $501_m$). Data arising from and/or gathered by any backup job or portion thereof from any node can be stored in the storage pool (e.g., in metadata form), which data can derive from tasks that operate on a single node, or from tasks or communications between multiple nodes of the distributed storage system. In some cases, streams of storage I/O correspond to backup job performance measurements that are derived backup jobs (e.g., backup jobs that access a storage pool through a virtualized controller).

Further details regarding general approaches to managing a storage pool using a virtual machine that operates as a storage controller dedicated to a particular node are described in U.S. Pat. No. 8,601,473 titled, "ARCHITECTURE FOR MANAGING I/O AND STORAGE FOR A VIRTUALIZATION ENVIRONMENT" filed on Aug. 10, 2011, which is hereby incorporated by reference in its entirety.

Centralized Administration

One or more administrators (e.g., user $505_1$ and user $505_m$, respectively) can access any instance of a dynamic scheduler to manage a single cluster, multiple clusters, and/or other portions of the distributed storage system infrastructure. In certain embodiments, the user interface to a dynamic scheduler (e.g., dynamic scheduler $101_{CN}$) can be based on web technology (e.g., HTML5, REST API, CLI, PowerShell CMDlets, etc.) so as to facilitate efficient access (e.g., in a browser).

FIG. 5B presents an environment 5B00 in which embodiments of the present disclosure can operate. As an option, one or more variations of environment 5B00 or any aspect thereof may be implemented in the context of the architecture and functionality of the embodiments described herein.

The environment 5B00 shows various components that are interconnected so as to support deployment of various computing jobs. A computing job can run on a single node as a virtual machine or container, or a backup job can be partitioned and deployed as multiple tasks (e.g., within or as a virtual machine or container) that are partitioned and coordinated to operate over multiple nodes (e.g., first job $502_1$ and second job $502_m$). Data arising from and/or gathered by any job or portion thereof from any node can be stored in the storage pool (e.g., in metadata form), which data can derive from tasks that operate on a single node, or from tasks or communications between multiple nodes of the distributed storage system.

Additional Embodiments of the Disclosure

Additional Practical Application Examples

Figure 6A:
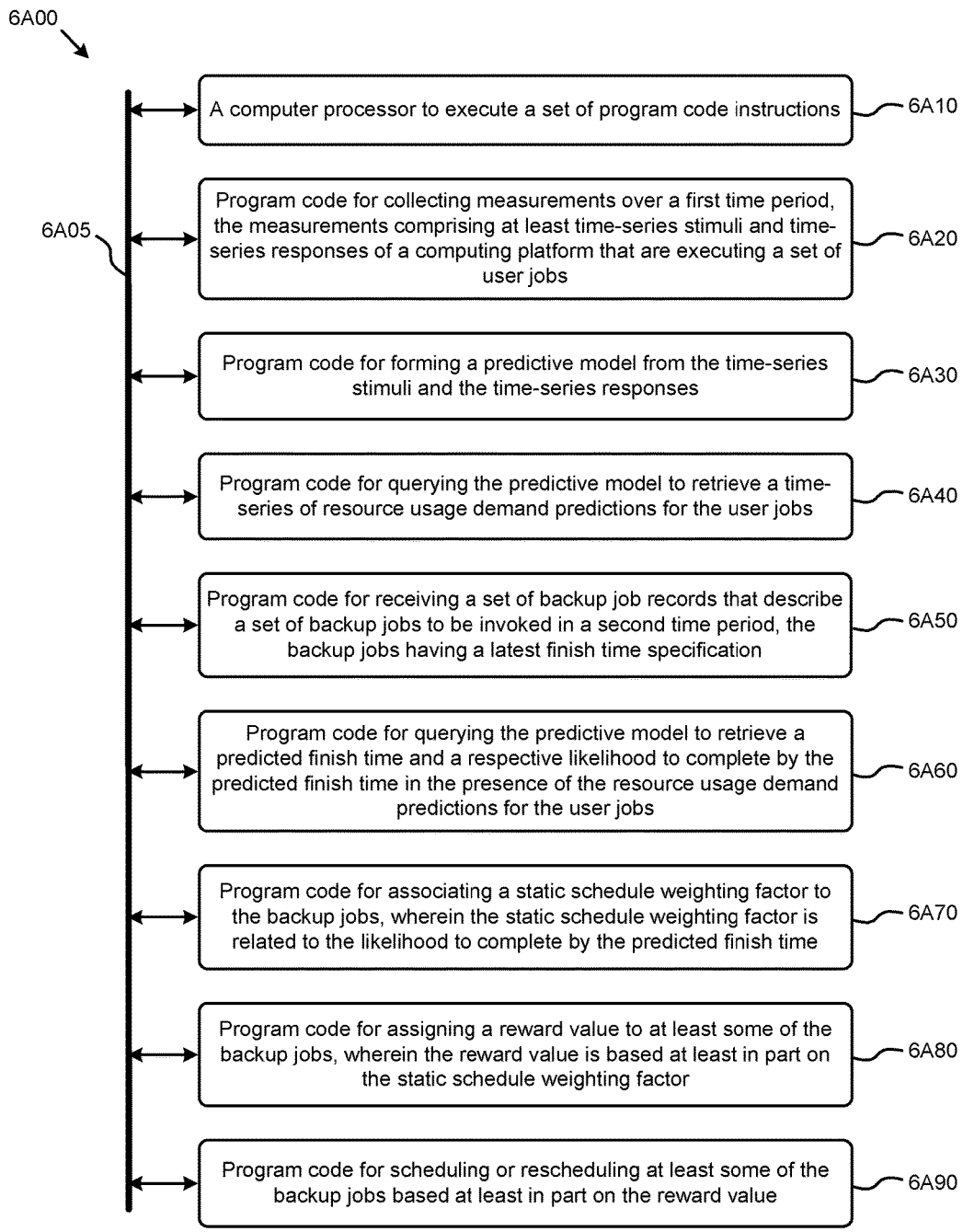
FIG. 6A and FIG. 6B depict system components as arrangements of computing modules that are interconnected so as to implement certain of the herein-disclosed embodiments.

FIG. 6A depicts a system 6A00 as an arrangement of computing modules that are interconnected so as to operate cooperatively to implement certain of the herein-disclosed embodiments. The partitioning of system 6A00 is merely illustrative and other partitions are possible. As an option, the system 6A00 may be implemented in the context of the architecture and functionality of the embodiments described herein. Of course, however, the system 6A00 or any operation therein may be carried out in any desired environment.

The system 6A00 comprises at least one processor and at least one memory, the memory serving to store program instructions corresponding to the operations of the system. As shown, an operation can be implemented in whole or in part using program instructions accessible by a module. The modules are connected to a communication path 6A05, and any operation can communicate with other operations over communication path 6A05. The modules of the system can, individually or in combination, perform method operations within system 6A00. Any operations performed within system 6A00 may be performed in any order unless as may be specified in the claims.

The shown embodiment implements a portion of a computer system, presented as system 6A00, comprising a computer processor to execute a set of program code instructions (module 6A10) and modules for accessing memory to hold program code instructions to perform: collecting measurements over a first time period, the measurements comprising at least time-series stimuli and time-series responses of a computing platform that executes a set of user jobs (module 6A20); forming a predictive model from the time-series stimuli and the time-series responses (module 6A30); querying the predictive model to retrieve a time-series of resource usage demand predictions for the user jobs (module 6A40); receiving a set of backup job records that describe a set of backup jobs to be invoked in a second time period, the backup jobs having a latest finish time specification (module 6A50); querying the predictive model to retrieve a predicted finish time and a respective likelihood to complete by the predicted finish time in the presence of the resource usage demand predictions for the user jobs (module 6A60); associating a static schedule weighting factor to the backup jobs, wherein the static schedule weighting factor is related to the likelihood to complete by the predicted finish time (module 6A70); assigning a reward value to at least some of the backup jobs, wherein the reward value is based at least in part on the static schedule weighting factor (module 6A80); and scheduling or rescheduling at least some of the backup jobs based at least in part on the reward value (module 6A90).

Variations of the foregoing may include more or fewer of the modules and variations may perform more or fewer (or different) steps, and may use data elements in more or fewer (or different) operations.

Figure 6B:
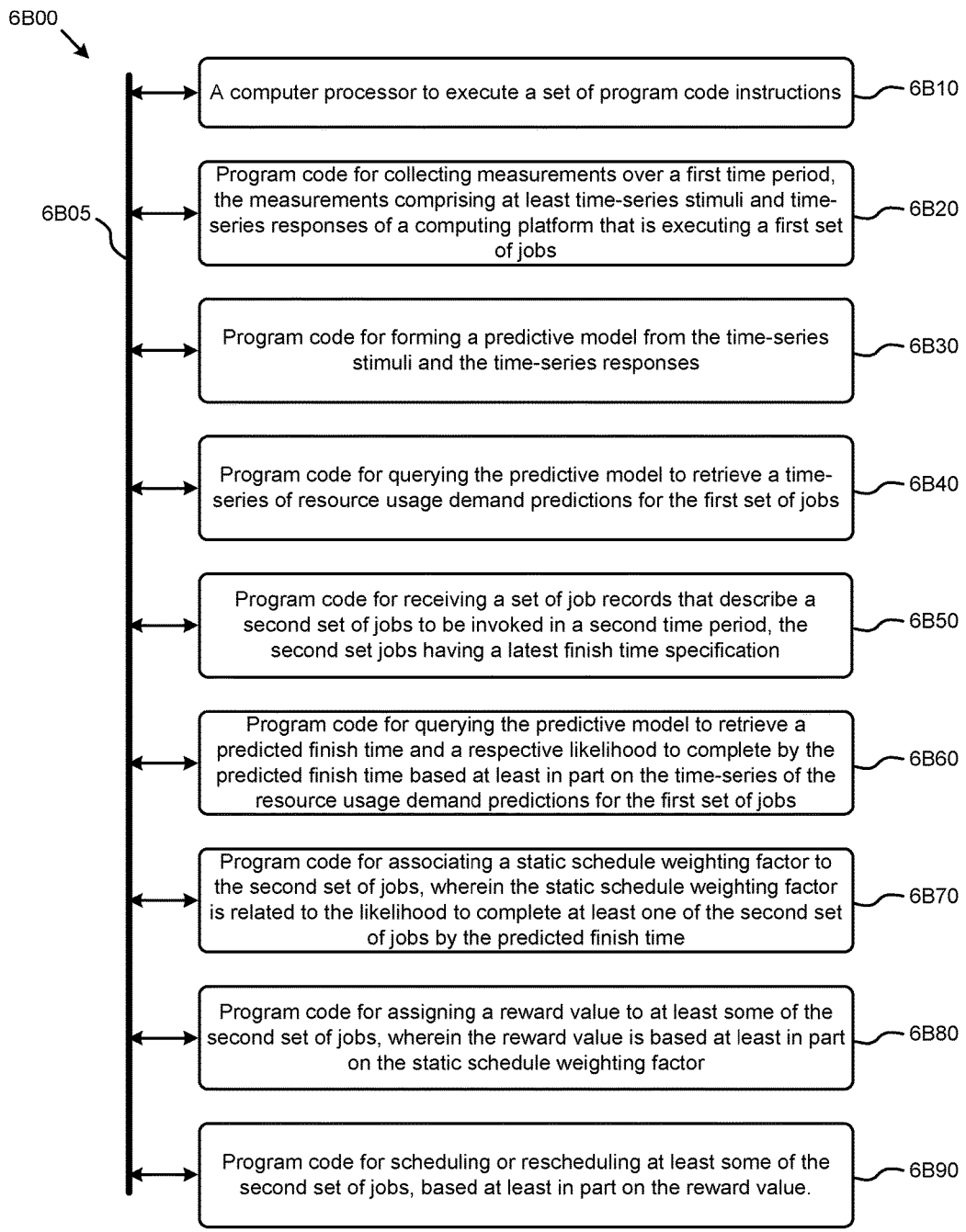

FIG. 6B depicts a system 6B00 as an arrangement of computing modules that are interconnected so as to operate cooperatively to implement certain of the herein-disclosed embodiments. The partitioning of system 6B00 is merely illustrative and other partitions are possible. As an option, the system 6B00 may be implemented in the context of the architecture and functionality of the embodiments described herein. Of course, however, the system 6B00 or any operation therein may be carried out in any desired environment. The system 6B00 comprises at least one processor and at least one memory, the memory serving to store program instructions corresponding to the operations of the system. As shown, an operation can be implemented in whole or in part using program instructions accessible by a module. The modules are connected to a communication path 6B05, and any operation can communicate with other operations over communication path 6B05. The modules of the system can, individually or in combination, perform method operations within system 6B00. Any operations performed within system 6B00 may be performed in any order unless as may be specified in the claims. The shown embodiment implements a portion of a computer system, presented as system 6B00, comprising a computer processor to execute a set of program code instructions (module 6B10) and modules for accessing memory to hold program code instructions to perform: collecting measurements over a first time period, the measurements comprising at least time-series stimuli and time-series responses of a computing platform that is executing a first set of jobs (module 6B20); forming a predictive model from the time-series stimuli and the time-series responses (module 6B30); querying the predictive model to retrieve a time series of resource usage demand predictions for the first set of jobs (module 6B40); receiving a set of job records that describe a second set of jobs to be invoked in a second time period, the second set jobs having a latest finish time specification (module 6B50); querying the predictive model to retrieve a predicted finish time and a respective likelihood to complete by the predicted finish time based at least in part on the time series of the resource usage demand predictions for the first set of jobs (module 6B60); associating a static schedule weighting factor to the second set of jobs, wherein the static schedule weighting factor is related to the likelihood to complete at least one of the second set of jobs by the predicted finish time (module 6B70); assigning a reward value to at least some of the second set of jobs, wherein the reward value is based at least in part on the static schedule weighting factor (module 6B80); and rescheduling at least some of the second set of jobs, based at least in part on the reward value (module 6B90).

System Architecture Overview

Additional System Architecture Examples

Figure 7A:
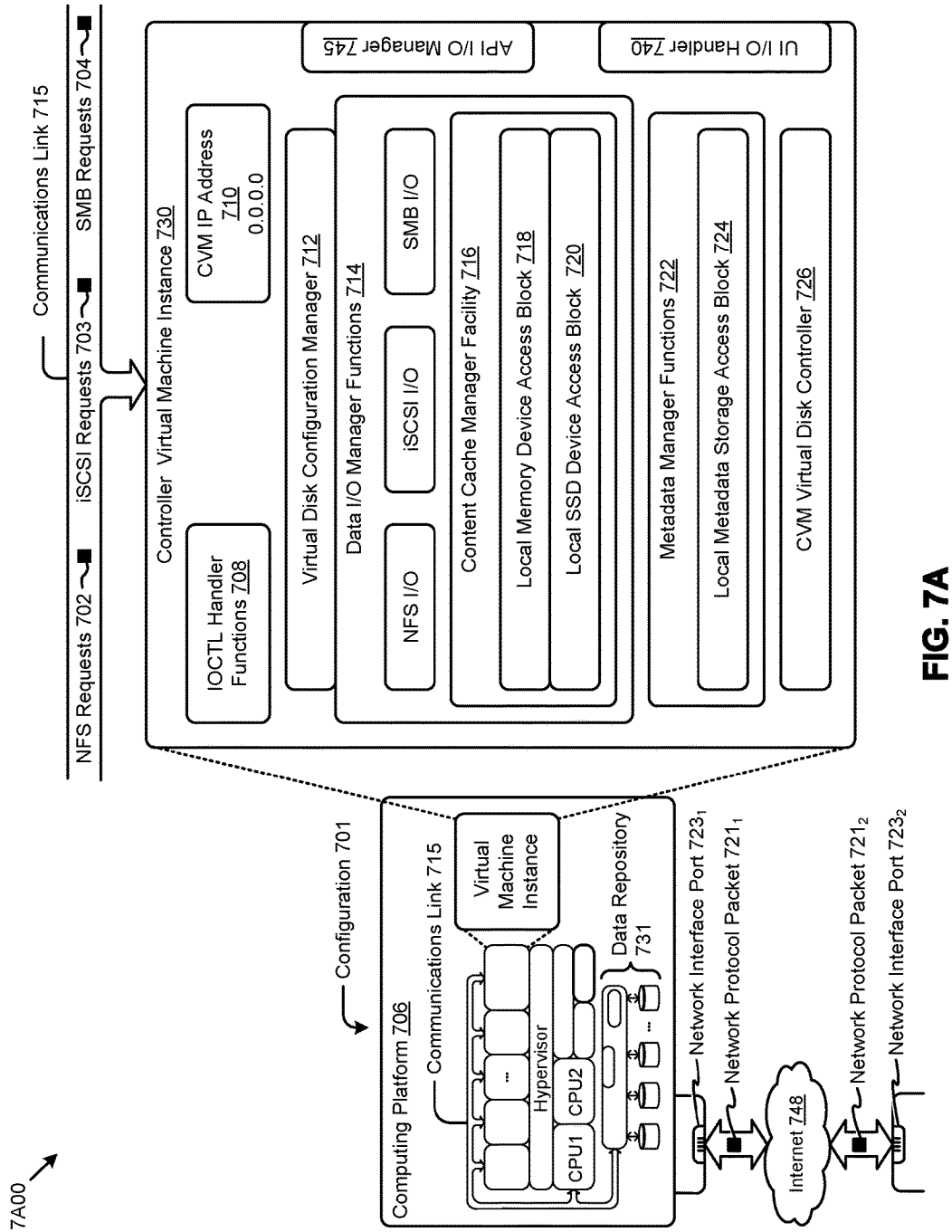
FIG. 7A and FIG. 7B depict virtualized controller architectures comprising collections of interconnected components suitable for implementing embodiments of the present disclosure and/or for use in the herein-described environments.

FIG. 7A depicts a virtualized controller as implemented by the shown virtual machine architecture 7A00. The virtual machine architecture comprises a collection of interconnected components suitable for implementing embodiments of the present disclosure and/or for use in the herein-described environments. Moreover, the shown virtual machine architecture 7A00 includes a virtual machine instance in a configuration 701 that is further described as pertaining to the controller virtual machine instance 730. A controller virtual machine instance receives block I/O (input/output or IO) storage requests as network file system (NFS) requests in the form of NFS requests 702, and/or internet small computer storage interface (iSCSI) block IO requests in the form of iSCSI requests 703, and/or Samba file system (SMB) requests in the form of SMB requests 704. The controller virtual machine (CVM) instance publishes and responds to an internet protocol (IP) address (e.g., CVM IP address 710). Various forms of input and output (I/O or IO) can be handled by one or more IO control handler functions (IOCTL functions 708) that interface to other functions such as data IO manager functions 714 and/or metadata manager functions 722. As shown, the data IO manager functions can include communication with a virtual disk configuration manager 712 and/or can include direct or indirect communication with any of various block IO functions (e.g., NFS IO, iSCSI IO, SMB IO, etc.).

In addition to block IO functions, the configuration 701 supports IO of any form (e.g., block IO, streaming IO, packet-based IO, HTTP traffic, etc.) through either or both of a user interface (UI) handler such as UI IO handler 740 and/or through any of a range of application programming interfaces (APIs), possibly through the shown API IO manager 745.

The communications link 715 can be configured to transmit (e.g., send, receive, signal, etc.) any types of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases the payload comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as disk drives or tape drives. Volatile media includes dynamic memory such as a random access memory. As shown, the controller virtual machine instance 730 includes a content cache manager facility 716 that accesses storage locations, possibly including local dynamic random access memory (DRAM) (e.g., through the local memory device access block 718) and/or possibly including accesses to local solid state storage (e.g., through local SSD device access block 720).

Common forms of computer readable media includes any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of external data repository 731, which in turn can be formatted into any one or more storage areas, and which can comprise parameterized storage accessible by a key (e.g., a filename, a table name, a block address, an offset address, etc.). An external data repository 731 can store any forms of data, and may comprise a storage area dedicated to storage of metadata pertaining to the stored forms of data. In some cases, metadata, can be divided into portions. Such portions and/or cache copies can be stored in the external storage data repository and/or in a local storage area (e.g., in local DRAM areas and/or in local SSD areas). Such local storage can be accessed using functions provided by a local metadata storage access block 724. The external data repository 731 can be configured using a CVM virtual disk controller 726, which can in turn manage any number or any configuration of virtual disks.

Execution of the sequences of instructions to practice certain embodiments of the disclosure are performed by a one or more instances of a processing element such as a data processor, or such as a central processing unit (e.g., CPU1, CPU2). According to certain embodiments of the disclosure, two or more instances of a configuration 701 can be coupled by a communications link 715 (e.g., backplane, LAN, PTSN, wired or wireless network, etc.) and each instance may perform respective portions of sequences of instructions as may be required to practice embodiments of the disclosure.

The shown computing platform 706 is interconnected to the Internet 748 through one or more network interface ports (e.g., network interface port $723_1$ and network interface port $723_2$). The configuration 701 can be addressed through one or more network interface ports using an IP address. Any operational element within computing platform 706 can perform sending and receiving operations using any of a range of network protocols, possibly including network protocols that send and receive packets (e.g., network protocol packet $721_1$ and network protocol packet $721_2$).

The computing platform 706 may transmit and receive messages that can be composed of configuration data, and/or any other forms of data and/or instructions organized into a data structure (e.g., communications packets). In some cases, the data structure includes program code instructions (e.g., application code) communicated through Internet 748 and/or through any one or more instances of communications link 715. Received program code may be processed and/or executed by a CPU as it is received and/or program code may be stored in any volatile or non-volatile storage for later execution. Program code can be transmitted via an upload (e.g., an upload from an access device over the Internet 748 to computing platform 706). Further, program code and/or results of executing program code can be delivered to a particular user via a download (e.g., a download from the computing platform 706 over the Internet 748 to an access device).

The configuration 701 is merely one sample configuration. Other configurations or partitions can include further data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor. Some embodiments include one or more special-purpose hardware components (e.g., power control, logic, sensors, transducers, etc.). A module may include one or more state machines and/or combinational logic used to implement or facilitate the operational and/or performance characteristics of the herein-disclosed embodiments for dynamically readjusting resource allocations to jobs based on changing resource availabilities.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects pertaining to dynamically readjusting resource allocations to jobs based on changing resource availabilities. Such files or records can be brought into and/or stored in volatile or non-volatile memory.

Figure 7B:
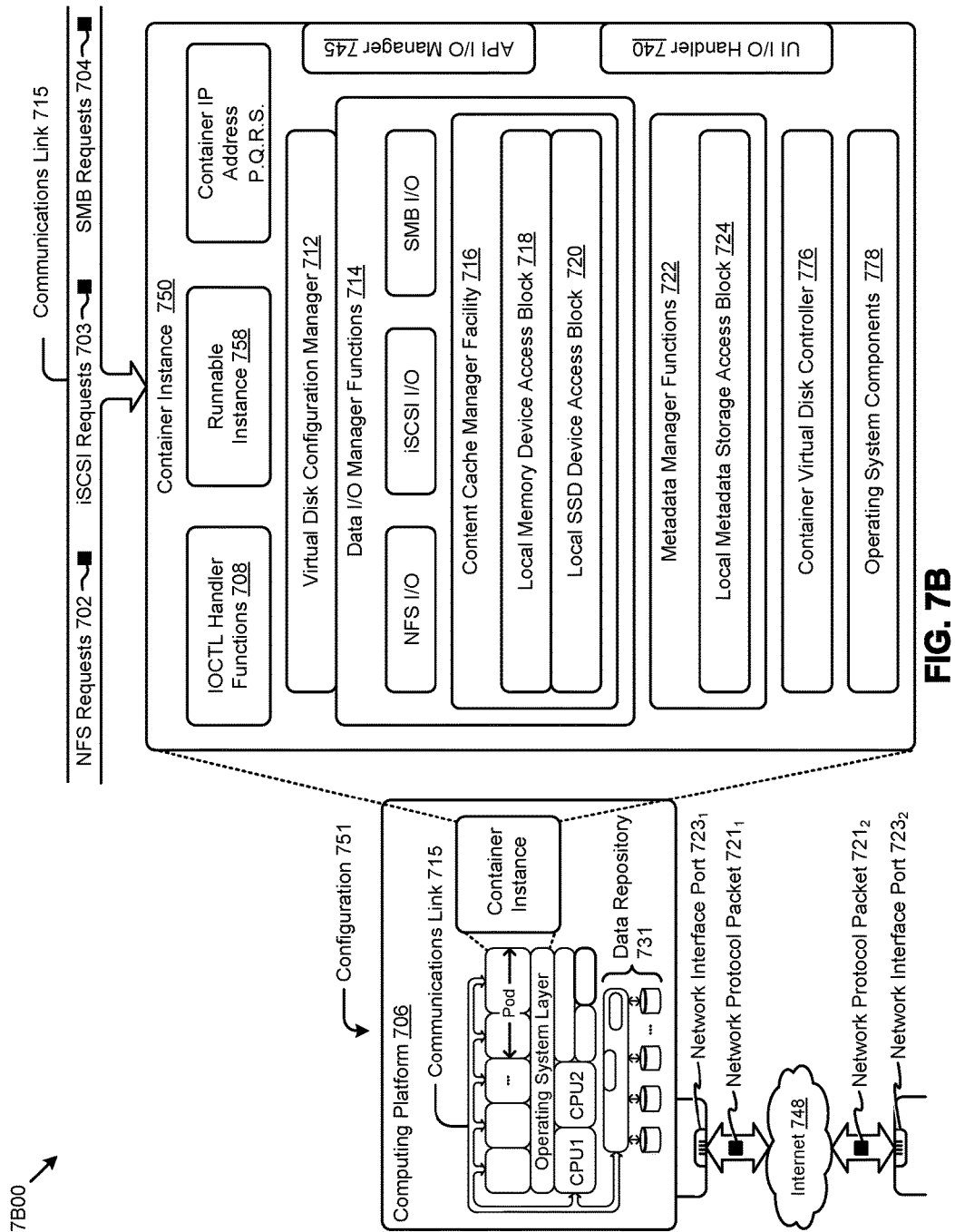

FIG. 7B depicts a virtualized controller implemented by a containerized architecture 7B00. The containerized architecture comprises a collection of interconnected components suitable for implementing embodiments of the present disclosure and/or for use in the herein-described environments. Moreover, the shown containerized architecture 7B00 includes a container instance in a configuration 751 that is further described as pertaining to the container instance 750. The configuration 751 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any container (e.g., container instance 750). A container instance can be executed by a processor. Runnable portions of a container instance sometimes derive from a container image, which in turn might include all, or portions of any of, a Java archive repository (JAR) and/or its contents, and/or a script or scripts and/or a directory of scripts, and/or a virtual machine configuration, and may include any dependencies therefrom. In some cases a configuration within a container might include an image comprising a minimum set of runnable code. Contents of larger libraries and/or code or data that would not be accessed during runtime of the container instance can be omitted from the larger library to form a smaller library composed of only the code or data that would be accessed during runtime of the container instance. In some cases, start-up time for a container instance can be much faster than start-up time for a virtual machine instance, at least inasmuch as the container image might be much smaller than a respective virtual machine instance. Furthermore, start-up time for a container instance can be much faster than start-up time for a virtual machine instance, at least inasmuch as the container image might have many fewer code and/or data initialization steps to perform than a respective virtual machine instance.

A container instance (e.g., a Docker container) can serve as an instance of an application container. Any container of any sort can be rooted in a directory system, and can be configured to be accessed by file system commands (e.g., "ls" or "ls -a", etc.). The container might optionally include operating system components 778, however such a separate set of operating system components need not be provided. As an alternative, a container can include a runnable instance 758, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, a container virtual disk controller 776. Such a container virtual disk controller can perform any of the functions that the aforementioned CVM virtual disk controller 726 can perform, yet such a container virtual disk controller does not rely on a hypervisor or any particular operating system so as to perform its range of functions.

In some environments multiple containers can be collocated and/or can share one or more contexts. For example, multiple containers that share access to a virtual disk can be assembled into a pod (e.g., a Kubernetes pod). Pods provide sharing mechanisms (e.g., when multiple containers are amalgamated into the scope of a pod) as well as isolation mechanisms (e.g., such that the namespace scope of one pod does not share the namespace scope of another pod).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method comprising:
   collecting measurements over a first time period, the measurements comprising at least time-series stimuli and time-series responses of a computing platform that is executing a set of foreground jobs;
   forming an initial predictive model from the time-series stimuli and the time-series responses, wherein the initial predictive model is used to derive a respective degree of confidence which correlates to a respective percentage corresponding to a respective likelihood for a respective set of jobs to complete by a respective predicted finish time;
   querying the initial predictive model to retrieve a time series of resource usage demand predictions for the set of foreground jobs;
   receiving a set of job records that describe a set of background jobs to be invoked in a second time period, the set of background jobs having a latest finish time specification;
   querying, for the set of background jobs, the initial predictive model to retrieve a predicted finish time and a percentage corresponding to a likelihood to complete by the predicted finish time based at least in part on the time series of the resource usage demand predictions for the set of foreground jobs;
   associating a static schedule weighting factor to the set of background jobs, wherein the static schedule weighting factor is related to the percentage corresponding to the respective likelihood to complete at least one of the set of background jobs by the predicted finish time;
   assigning a reward value to at least some of the set of background jobs, wherein the reward value is based at least in part on the static schedule weighting factor;
   scheduling the second set of background jobs, based at least in part on the reward value;
   forming an updated predictive model based on the initial predictive model and new time-series stimuli; and
   automatically re-scheduling, based on the updated predictive model, at least some of the set of background jobs, wherein the re-scheduling causes a readjustment to the resources allocated to the at least some of the set of background jobs.

2. The method of claim 1, further comprising, after invoking at least some of the second set of background jobs to execute on the computing platform, then querying the initial predictive model again to retrieve a time series of then-current resource usage demand predictions for a set of then-current user jobs.

3. The method of claim 1, wherein the likelihood to complete by the predicted finish time is determined by one or more queries to the initial predictive model.

4. The method of claim 1, wherein the static schedule weighting factor is based at least in part on a determination of a schedule using a threshold.

5. The method of claim 1, wherein the reward value is based on the likelihood to complete by an end time.

6. The method of claim 1, wherein the reward value is based at least in part on a likelihood of breaching a threshold.

7. The method of claim 1, wherein at least one of the job records describes a backup job that has a constraint from a service level agreement.

8. A computer readable medium, embodied in a non-transitory computer readable medium, the non-transitory computer readable medium having stored thereon a sequence of instructions which, when stored in memory and executed by one or more processors causes the one or more processors to perform a set of acts, the acts comprising:
   collecting measurements over a first time period, the measurements comprising at least time-series stimuli and time-series responses of a computing platform that is executing a set of foreground jobs;
   forming an initial predictive model from the time-series stimuli and the time-series responses, wherein the initial predictive model is used to derive a respective degree of confidence which correlates to a respective percentage corresponding to a respective likelihood for a respective set of jobs to complete by a respective predicted finish time;
   querying the initial predictive model to retrieve a time series of resource usage demand predictions for the set of foreground jobs;
   receiving a set of job records that describe a set of background jobs to be invoked in a second time period, the set of background jobs having a latest finish time specification;
   querying, for the set of background jobs, the initial predictive model to retrieve a predicted finish time and a percentage corresponding to a likelihood to complete by the predicted finish time based at least in part on the time series of the resource usage demand predictions for the set of foreground jobs;
   associating a static schedule weighting factor to the set of background jobs, wherein the static schedule weighting factor is related to the percentage corresponding to the respective likelihood to complete at least one of the set of background jobs by the predicted finish time;
   assigning a reward value to at least some of the set of background jobs, wherein the reward value is based at least in part on the static schedule weighting factor;
   scheduling the second set of background jobs, based at least in part on the reward value;

forming an updated predictive model based on the initial predictive model and new time-series stimuli; and automatically re-scheduling, based on the updated predictive model, at least some of the set of background jobs, wherein the re-scheduling causes a readjustment to the resources allocated to the at least some of the set of background jobs.

9. The computer readable medium of claim 8, wherein the likelihood to complete by the predicted finish time is determined by one or more queries to the initial predictive model.

10. The computer readable medium of claim 8, wherein the static schedule weighting factor is based at least in part on a determination of a schedule using a threshold.

11. The computer readable medium of claim 8, wherein the reward value is based on the likelihood to complete by an end time.

12. The computer readable medium of claim 8, wherein the reward value is based at least in part on a likelihood of breaching a threshold.

13. The computer readable medium of claim 8, wherein at least one of the job records describes a backup job that has a constraint from a service level agreement.

14. A system comprising:

a storage medium having stored thereon a sequence of instructions; and one or more processors that execute the instructions to cause the one or more processors to perform a set of acts, the acts comprising, collecting measurements over a first time period, the measurements comprising at least time-series stimuli and time-series responses of a computing platform that is executing a set of foreground jobs;

forming an initial predictive model from the time-series stimuli and the time-series responses, wherein the initial predictive model is used to derive a respective degree of confidence which correlates to a respective percentage corresponding to a respective likelihood for a respective set of jobs to complete by a respective predicted finish time;

querying the initial predictive model to retrieve a time series of resource usage demand predictions for the set of foreground jobs;

receiving a set of job records that describe a set of background jobs to be invoked in a second time period, the set of background jobs having a latest finish time specification;

querying, for the second set of background jobs, the initial predictive model to retrieve a predicted finish time and a percentage corresponding to a likelihood to complete by the predicted finish time based at least in part on the time series of the resource usage demand predictions for the set of foreground jobs;

associating a static schedule weighting factor to the set of background jobs, wherein the static schedule weighting factor is related to the percentage corresponding to the respective likelihood to complete at least one of the set of background jobs by the predicted finish time;

assigning a reward value to at least some of the set of background jobs, wherein the reward value is based at least in part on the static schedule weighting factor;

scheduling the second set of background jobs, based at least in part on the reward value;

forming an updated predictive model based on the initial predictive model and new time-series stimuli; and automatically re-scheduling, based on the updated predictive model, at least some of the set of background jobs, wherein the re-scheduling causes a readjustment to the resources allocated to the at least some of the set of background jobs.

15. The system of claim 14, wherein the likelihood to complete by the predicted finish time is determined by one or more queries to the initial predictive model.

16. The system of claim 14, wherein the static schedule weighting factor is based at least in part on a determination of a schedule using a threshold.

17. The system of claim 14, wherein the reward value is based on the likelihood to complete by an end time.

18. The system of claim 14, wherein the reward value is based at least in part on a likelihood of breaching a threshold.

19. The system of claim 14, wherein at least one of the job records describes a backup job.

20. The system of claim 14, wherein a backup job comprises a constraint from a service level agreement.

\* \* \* \* \*